(12) United States Patent
Roetteler et al.

(10) Patent No.: US 10,860,759 B2
(45) Date of Patent: Dec. 8, 2020

(54) SYSTEM FOR REVERSIBLE CIRCUIT COMPILATION WITH SPACE CONSTRAINT, METHOD AND PROGRAM

(71) Applicant: Microsoft Technology Licensing, LLC, Redmond, WA (US)

(72) Inventors: Martin Roetteler, Woodinville, WA (US); Krysta Svore, Seattle, WA (US); Alex Parent, Waterloo (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 82 days.

(21) Appl. No.: 15/735,102

(22) PCT Filed: Jun. 7, 2016

(86) PCT No.: PCT/US2016/036110
§ 371 (c)(1),
(2) Date: Dec. 8, 2017

(87) PCT Pub. No.: WO2016/200747
PCT Pub. Date: Dec. 15, 2016

(65) Prior Publication Data
US 2018/0181685 A1 Jun. 28, 2018

Related U.S. Application Data

(60) Provisional application No. 62/172,727, filed on Jun. 8, 2015.

(51) Int. Cl.
*G06F 30/327* (2020.01)
*G06N 10/00* (2019.01)

(52) U.S. Cl.
CPC .......... *G06F 30/327* (2020.01); *G06N 10/00* (2019.01)

(58) Field of Classification Search
CPC .............................. G06F 17/505; G06N 10/00
(Continued)

(56) References Cited

U.S. PATENT DOCUMENTS

| | | | |
|---|---|---|---|
| 6,578,018 B1 | 6/2003 | Ulyanov | |
| 7,219,017 B2 | 5/2007 | Vitaliano et al. | |

(Continued)

FOREIGN PATENT DOCUMENTS

| | | |
|---|---|---|
| CN | 101923457 | 12/2010 |
| WO | WO 2009/109041 | 9/2009 |

(Continued)

OTHER PUBLICATIONS

Abdollahi et al., "Reversible Logic Synthesis by Quantum Rotation Gates," *Quantum Information and Computation*, vol. 13, 22 pp. (Sep. 2013).

(Continued)

*Primary Examiner* — Suresh Memula
(74) *Attorney, Agent, or Firm* — Klarquist Sparkman, LLP

(57) ABSTRACT

The disclosed technology includes, among other innovations, a framework for resource efficient compilation of higher-level programs into lower-level reversible circuits. In particular embodiments, the disclosed technology reduces the memory footprint of a reversible network implemented in a quantum computer and generated from a higher-level program. Such a reduced-memory footprint is desirable in that it addresses the limited availability of qubits available in many target quantum computer architectures.

16 Claims, 29 Drawing Sheets

(58) Field of Classification Search
USPC ............................................................ 716/104
See application file for complete search history.

(56) References Cited

U.S. PATENT DOCUMENTS

| | | | |
|---|---|---|---|
| 7,427,876 B1* | 9/2008 | Wang | H03K 3/0372 326/46 |
| 7,886,261 B1 | 2/2011 | Irving et al. | |
| 8,190,553 B2 | 5/2012 | Routt | |
| 8,244,650 B2 | 8/2012 | Rose | |
| 9,881,256 B2* | 1/2018 | Hamze | G06F 9/02 |
| 10,320,360 B2* | 6/2019 | Wiebe | B82Y 10/00 |
| 2001/0044912 A1 | 11/2001 | Francis et al. | |
| 2003/0093451 A1 | 5/2003 | Chuang et al. | |
| 2003/0121028 A1 | 6/2003 | Coury et al. | |
| 2004/0025122 A1 | 2/2004 | Schubert et al. | |
| 2004/0078421 A1 | 4/2004 | Routt | |
| 2004/0246028 A1* | 12/2004 | Lee | H03K 19/1736 326/104 |
| 2007/0162262 A1 | 7/2007 | Tucci | |
| 2007/0266347 A1* | 11/2007 | Chang | G06N 10/00 716/103 |
| 2008/0028347 A1 | 1/2008 | Hiraoglu et al. | |
| 2008/0082946 A1 | 4/2008 | Zilic et al. | |
| 2008/0147049 A1 | 6/2008 | Amato et al. | |
| 2008/0238480 A1* | 10/2008 | Wang | H03K 3/037 326/46 |
| 2009/0228849 A1 | 9/2009 | Mossawir et al. | |
| 2010/0287374 A1* | 11/2010 | Roy | G06F 21/70 713/171 |
| 2011/0113392 A1 | 5/2011 | Chakraborty et al. | |
| 2013/0246495 A1 | 9/2013 | Svore et al. | |
| 2014/0245249 A1 | 8/2014 | Macready et al. | |
| 2016/0328253 A1* | 11/2016 | Majumdar | G06N 3/126 |
| 2017/0147303 A1* | 5/2017 | Amy | G06F 8/44 |

FOREIGN PATENT DOCUMENTS

| | | |
|---|---|---|
| WO | WO 2015/060915 | 4/2015 |
| WO | WO 2015/123083 | 8/2015 |

OTHER PUBLICATIONS

Abhari et al., "Scaffold: Quantum Programming Language," Princeton University Technical Report, 43 pp. (Jul. 2012).
Aho et al., *Compilers: Principles, Techniques, and Tools*, Second Edition, pp. 1-47. (Sep. 2006).
Altenkirch et al., "The Quantum IO Monad," Cambridge University Press, 40 pp. (Jan. 2001).
Bahi, "High Performance by Exploiting Information Locality Through Reverse Computing," Thesis, Université Paris-SUD, 129 pp. (Dec. 2011).
Bahi et al., "High Performance by Exploiting Information Locality Through Reverse Computing," *Int'l Symp. on Computer Architecture and High Performance Computing*, pp. 25-32 (Oct. 2011).
Beckman et al., "Efficient networks for quantum factoring," *Physical Review A*, vol. 54, No. 2, pp. 1034-1063 (Aug. 1996).
Bennett, "Logical Reversibility of Computation," *IBM Journal of Research and Development*, vol. 17, pp. 525-532 (Nov. 1973).
Bennett, "Time/Space Trade-Offs for Reversible Computation," *SIAM Journal on Computing*, vol. 18, Issue 4, pp. 766-776 (Aug. 1989).
Cuccaro et al., "A new quantum ripple-carry addition circuit," *Proc. of Quantum Physics*, 9 pp. (Oct. 2004).
Draper et al., "A Logarithmic-Depth Quantum Carry-Lookahead Adder," *Journal of Quantum Information and Computation*, 21 pp. (Jul. 2006).
Golubitsky et al., "A Study of Optimal 4-bit Reversible Toffoli Circuits and Their Synthesis," *IEEE Trans. on Computers*, vol. 61, Issue 9, pp. 1341-1353 (Sep. 2012).

Golumbic et al., "Factoring Logic Functions Using Graph Partitioning," *IEEE/ACM Int'l Conf. on Computer-Aided Design*, 4 pp. (Nov. 1999).
Green et al., "An Introduction to Quantum Programming in Quipper," *Int'l Conf. on Reversible Computation*, 15 pp. (Jul. 2013).
Green et al., "Quipper: A Scalable Quantum Programming Language," *ACM SIGPLAN Conf. on Programming Language Design and Implementation*, 10 pp. (Jun. 2013).
Guan et al., "Reversible Synthesis with Minimum logic function," *Int'l Conf. on Computational Intelligence and Security*, vol. 2, pp. 968-971 (Nov. 2006).
Gupta et al., "An Algorithm for Synthesis of Reversible Logic Circuits," *IEEE Trans. on Computer-Aided Design of Integrated Circuits and Systems*, vol. 25, No. 11, pp. 2317-2330 (Nov. 2006).
Heckey et al., "Compiler Management of Communication and Parallelism for Quantum Computation," *Int'l Conf. on Architectural Support for Programming Languages and Operating Systems*, 12 pp. (Mar. 2015).
International Search Report and Written Opinion dated Sep. 6, 2016, from International Patent Application No. PCT/US2016/036110, 14 pp.
Knill, "An Analysis of Bennett's Pebble Game," LANL Report LAUR-95-2258, 15 pp. (May 1995).
Kole et al., "Optimal Reversible Logic Circuit Synthesis based on a Hybrid DFS-BFS Technique," *Int'l Symp. on Electronic System Design*, pp. 208-212 (Dec. 2010).
Lapets et al., "Abstract Resource Cost Derivation for Logical Quantum Circuit Descriptions," *1st Annual Workshop on Functional Programming Concepts in Domain-Specific Languages*, 8 pp. (Sep. 2013).
Lapets et al., "QuaFL: A Typed DSL for Quantum Programming," *1st Annual Workshop on Functional Programming Concepts in Domain-Specific Languages*, 8 pp. (Sep. 2013).
Lin et al., "RMDDS: Reed-Muller Decision Diagram Synthesis of Reversible Logic Circuits," *ACM Journal on Emerging Technologies in Computing Systems*, vol. 10, 25 pp. (Feb. 2014).
Markov, "Limits on Fundamental Limits to Computation," *Nature*, 15 pp. (Aug. 2014).
Maslov et al., "Reversible Circuit Optimization via Leaving the Boolean Domain," *IEEE Trans. on Computer-Aided Design of Integrated Circuits and Systems*, vol. 30, No. 6, pp. 806-816 (Jun. 2011).
Maslov et al., "Techniques for the Synthesis of Reversible Toffoli Networks," *ACM Trans. on Design Automation of Electronic Systems*, vol. 12, Issues 4, 28 pp. (Sep. 2007).
Maslov et al., "Toffoli Network Synthesis With Templates," *IEEE Trans. on Computer-Aided Design of Integrated Circuits and Systems*, vol. 24, No. 6, pp. 807-817 (Jun. 2005).
Miller et al., "A Transformation Based Algorithm for Reversible Logic Synthesis," *Design Automation Conf.*, 6 pp. (Jun. 2003).
Mishchenko et al., "Boolean Factoring and Decomposition of Logic Networks," *Int'l Conf. on Computer-Aided Design*, 7 pp. (Nov. 2008).
Nielsen et al., "Quantum Computation and Quantum Information," Cambridge University Press, 698 pp. (Oct. 2000).
Ömer, "Quantum Programming in QCL," Thesis, Institute of Information Systems, Technical University of Vienna, 109 pp. (Jan. 2000).
Perumalla, "Introduction to Reversible Computing," *High Performance Computing & Simulation International Conference*, 3 pp. (Jul. 2014).
Saeedi et al., "Synthesis and Optimization of Reversible Circuits—A Survey," *ACM Computing Surveys*, vol. 45, No. 2, 34 pp. (Feb. 2013).
Selinger et al., "Quantum Lambda Calculus," Cambridge University Press, 46 pp. (May 2015).
Shafaei et al., "Reversible Logic Synthesis of k-Input, m-Output Lookup Tables," *Conf. on Design, Automation, and Test in Europe*, 6 pp. (Mar. 2013).
Shor, "Polynomial-Time Algorithms for Prime Factorization and Discrete Logarithms on a Quantum Computer," *SIAM Journal on Computing*, vol. 26, 28 pp. (Oct. 1997).

(56) References Cited

OTHER PUBLICATIONS

Syme et al., Expert F#, Chapter 3, "Introducing Functional Programming," pp. 27-68. (Oct. 2012).
Thomsen, "A Functional Language for Describing Reversible Logic," *Forum on Specification and Design Languages*, 8 pp. (Sep. 2012).
Wecker et al., "LIQUi|>: A Software Design Architecture and Domain-Specific Language for Quantum Computing," *Computing Research Repository*, 14 pp. (Feb. 2014).
Wikipedia, "MD5," 11 pp. (May 2015).
Wikipedia, "SHA-2," 13 pp. (May 2015).
Yokoyama et al., "A Reversible Programming Language and its Invertible Self-Interpreter," *ACM SIGPLAN Symp. on Partial Evaluation and Semantics-based Program Manipulation*, pp. 144-153 (Jan. 2007).
Aho et al., *Compilers—Principles, Techniques, and tools*, 804 pp. (Sep. 2006).
Amy et al., "Verified compilation of space-efficient reversible circuits," downloaded from arxiv.org, 24 pp. (Mar. 2016).
Bennett, "Logical Reversibility of Computation," *IBM J. Res. Develop.*, pp. 525-532 (Nov. 1973).
"Berkeley Logic Interchange Format (BLIF)," University of California Berkeley, 11 pp. (Jul. 1992).
Berry et al., "Exponential improvement in precision for simulating sparse Hamiltonians," *Proc. ACM Symp. on Theory of Computing*, pp. 283-292 (May 2014).
Buhrman et al., "Time and Space Bounds for Reversible Simulation," *Int'l Colloquium Automata, Languages and Programming*, 11 pp. (Jul. 2001).
Carøe, "Design of Reversible Computing Systems," Ph.D. thesis, University of Copenhagen, 54 pp. (Jul. 2012).
Chan, "Pebble Games and Complexity," University of California at Berkeley, Electrical Engineering and Computer Sciences, Technical Report No. UCB/EECS-2013-145, pp. (Aug. 2013).
Federal Information Processing Standards Publication 180-2, "Announcing the Secure Hash Standard," 76 pp. (Aug. 2002).
Frank et al., "Relativized Separation of Reversible and Irreversible Space-Time Complexity Classes," *Proc. of Information and Computation*, 39 pp. (May 2001).
Goldschmidt et al., "Approximation Algorithms for the k-Clique Covering Problem," *SIAM Journal on Discrete Mathematics*, vol. 9, Issue 3, 24 pp. (Aug. 1995).
Green, "Towards a formally verified functional quantum programming language," Ph.D. Thesis, University of Nottingham, 237 pp. (Jul. 2010).
Grover, "A fast quantum mechanical algorithm for database search," *Proc. of ACM Symp. on Theory of Computing*, pp. 212-219 (May 1996).
Hennessy et al., *Computer Architecture—A Quantitative Approach*, Fifth Edition, 848 pp. (Apr. 1990).
International Preliminary Report on Patentability dated Feb. 1, 2018, from International Patent Application No. PCT/US2016/061945, 8 pp.
International Search Report and Written Opinion dated Feb. 16, 2017, for International Patent Application No. PCT/US2016/061945, 13 pp.
JavadiAbhari et al., "ScaffCC: A Framework for Compilation and Analysis of Quantum Computing Programs," *Proc. of ACM Int'l Conf. on Computing Frontiers*, 10 pp. (May 2014).
Kowada et al., "Reversible Karatsuba's Algorithm," *Journal of Universal Computer Science*, vol. 12, No. 5, pp. 499-511 (Jun. 2006).
Lange et al., "Reversible Space Equals Deterministic Space," *Journal of Computer and System Sciences*, vol. 60, pp. 354-367 (Apr. 2000).
Levine et al., "A Note on Bennett's Space-Time Tradeoff for Reversible Computation," *SIAM J. Comput.*, vol. 19, No. 4, pp. 673-677 (Aug. 1990).
Lewandowski et al., "A Method for the Design and Verification of Reversible Logic Structures," University of South Florida College of Engineering Research Day, 1 p. (2011).
Menezes et al., *Handbook of Applied Cryptography*, CRC Press, 794 pp. (Oct. 1996).
Mohnke, "A Signature-Based Approach to Formal Logic Verification," Ph.D. Thesis, 88 pp. (Feb. 1999).
Office Action dated Jul. 27, 2018, from U.S. Appl. No. 15/060,408, 10 pp.
Office Action dated Feb. 7, 2019, From U.S. Appl. No. 15/060,408, 11 pp.
Parent et al., "Reversible circuit compilation with space constraints," 32 pp. (Oct. 2015).
Selinger et al., "Quantum Lambda Calculus," *Proc. of Semantic Techniques in Quantum Computation*, 46 pp. (2010).
Svore et al., "Toward a Software Architecture for Quantum Computing Design Tools," *Proc. Int'l Workshop on Quantum Programming Languages*, 20 pp. (Jul. 2004).
Valiron et al., "Programming the Quantum Future," *Comm. of the ACM*, vol. 58, No. 8, pp. 52-61 (Aug. 2015).
Wille, "An Introduction to Reversible Circuit Design," *Saudi Int'l Electronics, Communications and Photonics Conf.*, 4 pp. (Apr. 2011).
Written Opinion of the International Preliminary Examining Authority dated Oct. 26, 2017, from International Patent Application No. PCT/US2016/061945, 7 pp.
Yang, "Logic Synthesis and Optimization Benchmarks User Guide, Version 3.0," Technical Report, 44 pp. (Jan. 1991).
Yokoyama et al., "Principles of a Reversible Programming Language," *Conf. on Computing Frontiers*, pp. 43-54 (May 2008).
Communication pursuant to Article 94(3) EPC dated Sep. 12, 2019, from European Patent Application No. 16732070.4, 7 pp.
Final Office Action dated Aug. 21, 2019, from U.S. Appl. No. 15/060,408, 14 pp.
Kepley, "Quantum Circuits for F2n-multiplication with Subquadratic Gate Count," *Journal of Quantum Information Processing*, vol. 14, Issue 7, pp. 2373-2386 (Jul. 2015).
Perumalla, Introduction to Reversible Computing, 320 pp. (Sep. 2013).
Syme et al., *Expert F# 3.0*, 614 pp. (Nov. 2012).
Wang et al., "An XQDD-Based Verification Method for Quantum Circuits," *IEICE Trans. on Fundamentals of Electronics, Communications and Computer Sciences*, vol. E91.A, No. 2, pp. 584-594 (Jan. 2008).
Wille et al., *Towards a Design Flow for Reversible Logic*, 192 pp. (Aug. 2010).
Yokoyama et al., "Reversible Flowchart Languages and the Structured Reversible Program Theorem," *Int'l Colloquium on Automata, Languages and Programming*, pp. 258-270 (Jul. 2008).
Notice of Allowance dated Jan. 23, 2020, from U.S. Appl. No. 15/060,408, 12 pp.

* cited by examiner

300 ⟶

400 ⟶

500 ⟶

```
let xor4 (a:bool array) (b:bool array) =
    let c = Array.zeroCreate 4
    for i in 0 .. 3 do
        c.[i] <- a.[i] <> b.[i]
    c
let and4 (a:bool array) (b:bool array) =
    let d = Array.zeroCreate 4
    for i in 0 .. 3 do
        d.[i] <- a.[i] && b.[i]
    d
let mutable a = Array.zeroCreate 4
let b = Array.zeroCreate 4
let c = Array.zeroCreate 4
a <- xor4 a b
and4 a c
```

700

```
let f a b = a || b
let g a b = a && b
let h a b c d = f a b <> g c d
```

```
let carryRippleAdder (a:bool []) (b:bool []) =
    let n = Array.length a
    let result = Array.zeroCreate (n)
    result.[0] <- a.[0] <> b.[0]
    let mutable carry = a.[0] && b.[0]
    result.[1] <- a.[1] <> b.[1] <> carry
    for i in 2 .. n - 1 do
        // compute outgoing carry from current bits and incoming carry
        carry <- (a.[i-1] && (carry <> b.[i-1])) <> (carry && b.[i-1])
        result.[i] <- a.[i] <> b.[i] <> carry
    result
```

Figure 12

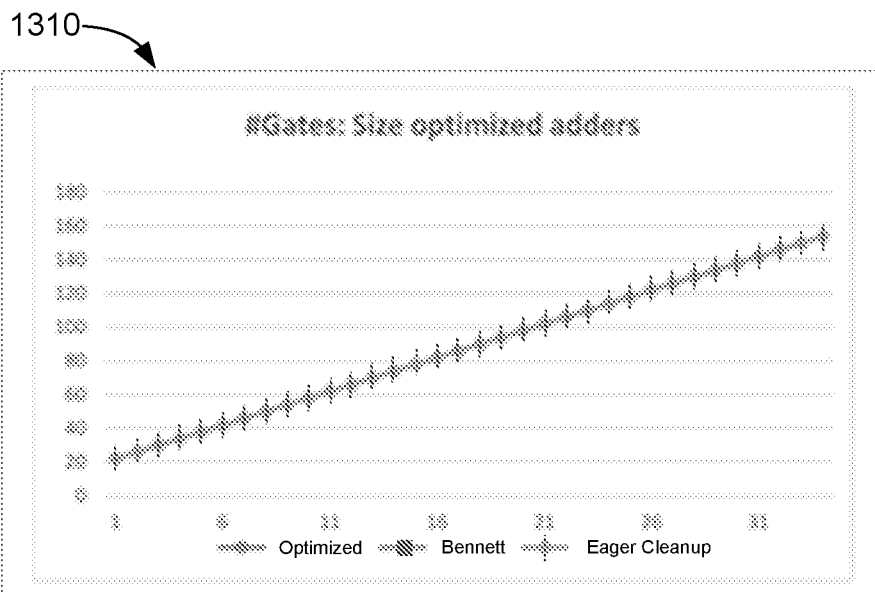
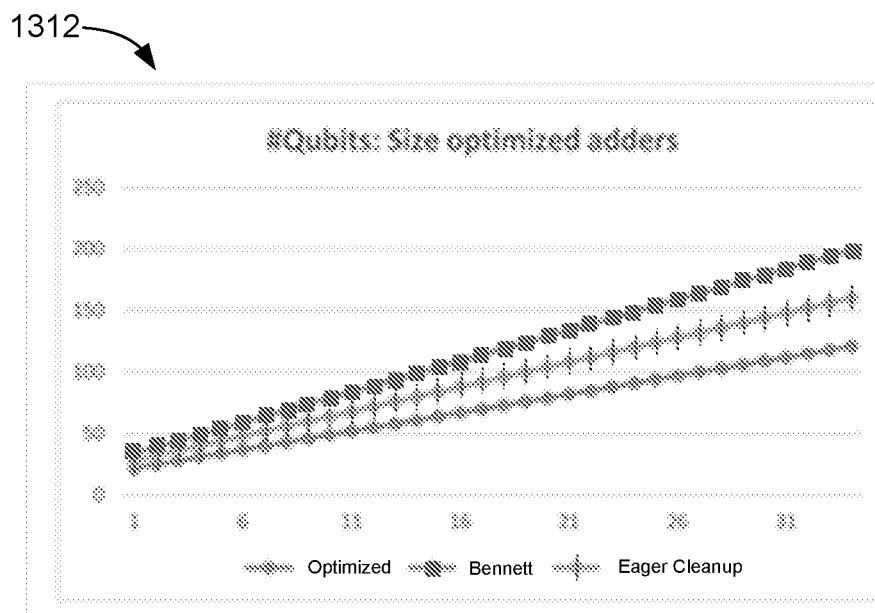
Figure 13

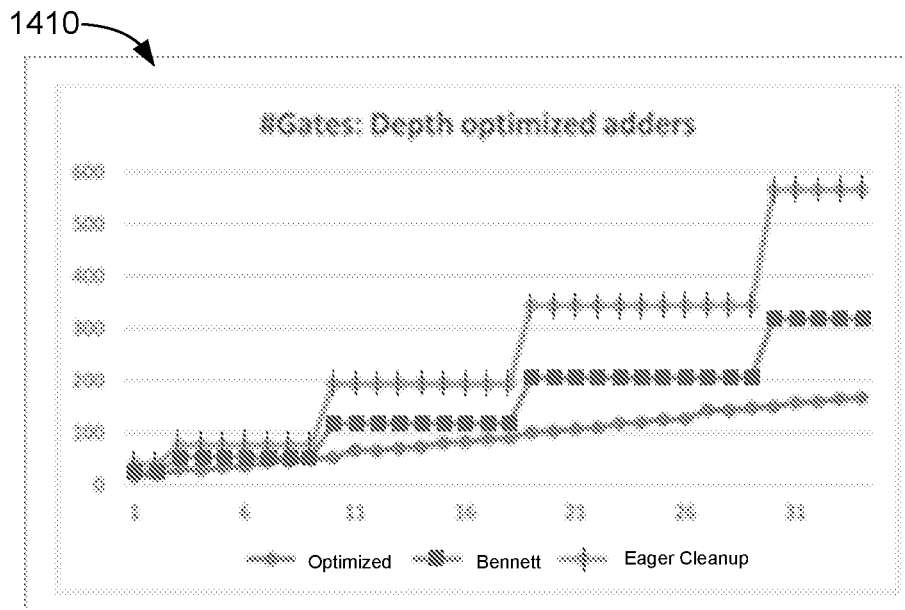
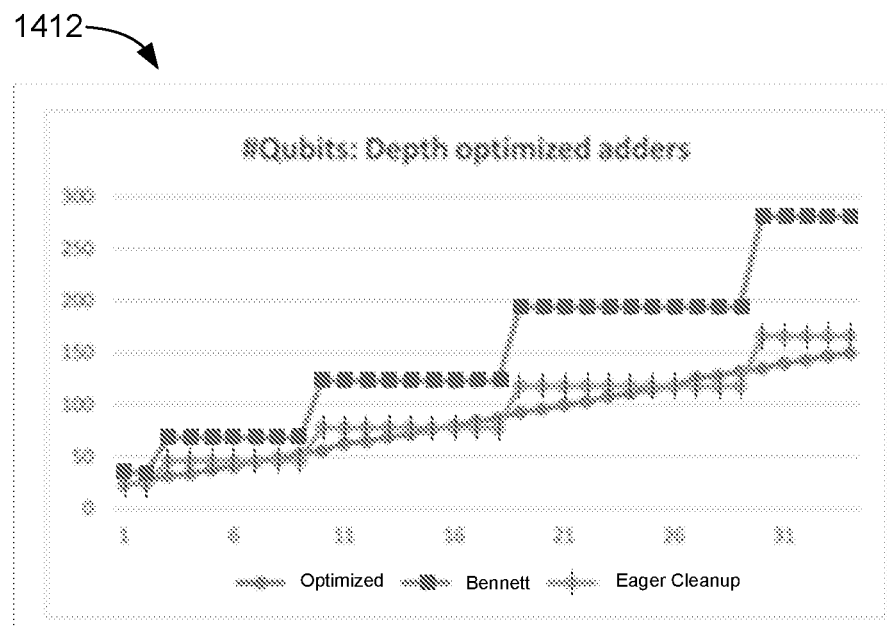
Figure 14

1500

```
for i in 0 .. n - 1 do
    // Inplace update of 32 bit registers
    h  <- addMod2_32 (ch e f g)
    h  <- addMod2_32 (s0 a)
    h  <- addMod2_32 w
    h  <- addMod2_32 k
    d  <- addMod2_32 h
    h  <- addMod2_32 (ma a b c)
    h  <- addMod2_32 (s1 e)
    let t = h
    //Reassignment for next iteration
    h <- g; g <- f; f <- e; e <- d
    d <- c; c <- b; b <- a; a <- t
```

1600

1700

2900

```
let carrySelectAdder n =
    let adderSize = int (sqrt (float n))
    let imSpacing = 2*(adderSize+1)
    <@@
        let carryRipple (a:bool array) (b:bool array) (carry:bool) =
            let result = Array.zeroCreate (adderSize + 1)
            result.(0) <- a.(0) <> b.(0)
            let mutable carry = a.(0) && b.(0)
            result.(1) <- a.(1) <> b.(1) <> carry
            for i in 2 .. adderSize - 1 do
                carry <- (a.(i-1) && (carry <> b.(i-1))) <> (carry && b.(i
                    -1))
                result.(i) <- a.(i) <> b.(i) <> carry
            result
        let a = Array.zeroCreate (adderSize * adderSize)
        let b = Array.zeroCreate (adderSize * adderSize)
        let a0b0 = carryRipple a.(0..adderSize-1) b.(0..adderSize-1) false
        let a' = a.(adderSize .. adderSize*adderSize-1)
        let b' = b.(adderSize .. adderSize*adderSize-1)
        let mutable intermediateResults = Array.zeroCreate (0)
        for i in 0 .. adderSize - 2 do
            intermediateResults <- Array.append intermediateResults
                (carryRipple a'.(i*adderSize .. i*adderSize + adderSize-1)
                             b'.(i*adderSize .. i*adderSize + adderSize-1)
                             false)
            intermediateResults <- Array.append intermediateResults
                (carryRipple a'.(i*adderSize .. i*adderSize + adderSize-1)
                             b'.(i*adderSize .. i*adderSize + adderSize-1) true
                )
        let mutable result = Array.zeroCreate (0)
        result <- Array.append result (a0b0.(0..adderSize-1))
        let mutable carry = a0b0.(adderSize)
        for i in 0 .. adderSize - 2 do
            let sum =
                if carry then
                    carry <- intermediateResults.(i*imSpacing+adderSize)
                    intermediateResults.(i*imSpacing..i*imSpacing+adderSize
                        -1)
                else
                    carry <- intermediateResults.(i*imSpacing+2*adderSize+1)
                    intermediateResults.
                        (i*imSpacing+adderSize+1..i*imSpacing+2*adderSize)
            result <- Array.append result sum
        result
    @@>
```

Figure 29

```
let exprSha n =
    <@
    let mutable k = Array.zeroCreate 32
    let mutable w = Array.zeroCreate 32
    let mutable a = Array.zeroCreate 32
    let mutable b = Array.zeroCreate 32
    let mutable c = Array.zeroCreate 32
    let mutable d = Array.zeroCreate 32
    let mutable e = Array.zeroCreate 32
    let mutable f = Array.zeroCreate 32
    let mutable g = Array.zeroCreate 32
    let mutable h = Array.zeroCreate 32 let addMod2_32 (a :bool array) =
        let b = Array.zeroCreate 32
        let mutable c = false
        b.[0] <- b.[0] <> a.[0]
        c <- c <> a.[0]
        a.[0] <- a.[0] <> (c && b.[0])
        for i in 1 .. 30 do
            b.[i] <- b.[i] <> a.[i]
            a.[i-1] <- a.[i-1] <> a.[i]
            a.[i] <- a.[i] <> (a.[i-1] && b.[i])
        b.[31] <- b.[31] <> a.[31]
        b.[31] <- b.[31] <> a.[30]
        for i in 2 .. n - 1 do
            a.[32-i] <- a.[32-i] <> (a.[31-i] && b.[32-i])
            a.[31-i] <- a.[31-i] <> a.[32-i]
            b.[32-i] <- b.[32-i] <> a.[31-i]
        a.[0] <- a.[0] <> (c && b.[0])
        c <- c <> a.[0]
        b.[0] <- b.[0] <> c
        clean c
        b
```

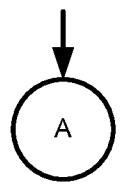

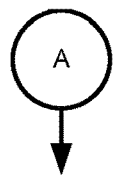
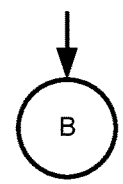
Figure 31B

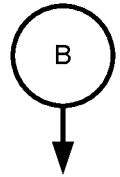

```
    t <- addMod2_32 M.[32*((5*i+1)%16)..32*((5*i+1)%16)+31]
    t <- rot s.[i] t
    B <- addMod2_32 t
    let temp = D
    D <- C; C <- B; A <- temp for i in 32 .. 47 do
    let mutable t = Array.zeroCreate 32
    t <- addMod2_32 A
    t <- addMod2_32 (B B C D)
    t <- addMod2_32 K
    t <- addMod2_32 M.[32*((3*i+5)%16)..32*((3*i+5)%16)+31]
    t <- rot s.[i] t
    B <- addMod2_32 t
    let temp = D
    D <- C; C <- B; A <- temp for i in 48 .. 63 do
    let mutable t = Array.zeroCreate 32
    t <- addMod2_32 A
    t <- addMod2_32 (I B C D)
    t <- addMod2_32 K
    t <- addMod2_32 M.[32*((7*i)%16)..32*((7*i)%16)+31]
    t <- rot s.[i] t
    B <- addMod2_32 t
    let temp = D
    D <- C; C <- B; A <- temp
Array.concat [A; B; C; D]
@>
```

Figure 31C

SYSTEM FOR REVERSIBLE CIRCUIT COMPILATION WITH SPACE CONSTRAINT, METHOD AND PROGRAM

CROSS REFERENCE TO RELATED APPLICATIONS

This application is the U.S. National Stage of International Application No. PCT/US2016/036110, filed Jun. 7, 2016, which was published in English under PCT Article 21(2), which in turn claims the benefit of U.S. Provisional Application No. 62/172,727, filed Jun. 8, 2015. The provisional application is incorporated herein in its entirety.

FIELD

This application relates to reversible computing, such as quantum computing. In particular, this application discloses embodiments for performing resource-efficient compilation of higher-level programs into lower-level reversible circuits.

BACKGROUND

Reversible computing addresses the problem of performing computations in a way that allows for the inversion of program execution (e.g., recovery of the input data to a program from the produced output data). Among the plurality of applications of reversible computing is quantum computing. Quantum computing is a primary target application for reversible computing as it uses reversible computing to incorporate classical functions into the quantum computer machine model. Other applications of reversible computing include ultra-low-power adiabatic circuits, which are classical models of computation that conserve energy almost entirely at the price of having lower clock speeds.

In general, quantum computing has the potential to revolutionize the way in which difficult computational problems are solved. For example, quantum computing has the potential to perform certain functions exponentially faster than any currently known classical algorithm can. Quantum computing and, more generally, reversible computing also present unique computing considerations that are unlike any found in classical computing. For example, quantum computers use quantum bits (qubits) as computing resources. The available number of qubits in a particular quantum computing architecture, however, may be significantly limited. Moreover, qubits (or, more generally, bits in a reversible circuit) are not typically re-useable during performance of a particular computation and rather have to be either measured or explicitly un-computed in order to make them re-usable. Current approaches to compiling programs for a reversible circuit (e.g., quantum computer) fail to account for and/or intelligently address the bit (e.g., qubit) limitations present in a given target reversible circuit (e.g., quantum computer) architecture. Additionally, current approaches to compiling programs for a reversible circuit (e.g., quantum computer) fail to recognize certain bits (e.g., qubits) used in the computations (e.g., certain ancilla bits or qubits) as being mutable, and available for possible re-use during performance of the computation.

SUMMARY

In summary, the detailed description presents innovations in reversible circuit designs, quantum computing designs, and compilers for generating circuit descriptions operable on such designs. The innovations can be implemented as part of a method, as part of a computing device or compilation system configured or programmed to perform any embodiment of the disclosed compilation/synthesis techniques, or as part of a tangible computer-readable media storing computer-executable instructions for causing a computing device to perform any embodiment of the disclosed compilation/synthesis techniques. The innovations can be implemented as part of a method or system for actually implementing quantum operations in a physical implementation of a quantum computer. The various innovations can be used in combination or separately.

Embodiments of the disclosed technology include, among other innovations, a framework for resource efficient compilation of higher-level programs into lower-level reversible circuits. In particular embodiments, the disclosed technology reduces the memory footprint of a reversible network implemented in a quantum computer and generated from a higher-level program. Such a reduced-memory footprint is desirable as it addresses the limited availability of qubits available in many target quantum computer architectures.

Embodiments of the disclosed technology introduce a variety of techniques that can be used to effectively account for and/or manage the number of bits or qubits used for a particular computation or circuit. For instance, the disclosed techniques use one or more of the following example innovations to reduce the number of bits or qubits used when computing classical, irreversible computations by means of reversible networks: (1) allowing the compiler (e.g., wherever possible) to make use of in-place functions to modify some of the variables; (2) an intermediate representation that allows the compiler/synthesis tool to trace data dependencies within the program; this allows one to determine the order in which ancilla bits or ancilla qubits (also known as "scratch space" bits or "scratch space" qubits and sometimes referred to simply "ancillas") are to be cleaned up and helps in identifying subsets of variables that are no longer needed for subsequent parts of the computation; cleaning those up realizes an analog of "garbage collection" for reversible circuits; or (3) using the concept of so-called "pebble games" to transform irreversible programs into reversible programs under space constraints, allowing for data to be erased and recomputed if needed.

Example embodiments of these techniques were implemented and tested. For instance, a compiler referred to herein as "Revs" was created and used to implement variations of the disclosed technology. Revs is a compiler for reversible circuits that can translate a subset of the functional programming language F# into reversible Toffoli networks which can then be further interpreted for instance in LIQUi|>, which itself is a domain-specific language for quantum computing and which is embedded into F#.

A number of test cases are discussed herein that illustrate one or more possible advantages that can be realized in certain example approaches disclosed herein. The test cases include example functions that demonstrate the scalability of the disclosed approaches. For instance, the test cases include a reversible implementation of SHA-2 and other hash-functions, reversible integer arithmetic, as well as a test-bench of combinational circuits used in classical circuit synthesis. By using embodiments of the disclosed technology, for example, it is possible to reduce space complexity by a factor of four or more, while having an only moderate increase in circuit size as well as in the time it takes to compile the reversible networks.

The foregoing and other objects, features, and advantages of the invention will become more apparent from the following detailed description, which proceeds with reference to the accompanying figures.

BRIEF DESCRIPTION OF THE DRAWINGS

FIG. 7 shows a third example program to be compiled/synthesized using embodiments of the disclosed technology.

FIG. 12 shows an example program that implements an example carry ripple adder.

FIG. 13 shows graphs comparing an example embodiment of the disclosed technology to other approaches.

FIG. 14 shows graphs comparing the resources used when using an example embodiment of the disclosed technology to other approaches.

FIG. 29 shows an example program that provides details of a depth-optimized adder considered herein.

FIGS. 30A-B show an example program that provides details for computing the entire round functions of the SHA-2 function considered herein.

FIGS. 31A-C show an example program that provides details for computing the entire round functions of the MD5 function considered herein.

DETAILED DESCRIPTION

I. General Considerations

Figure 1:
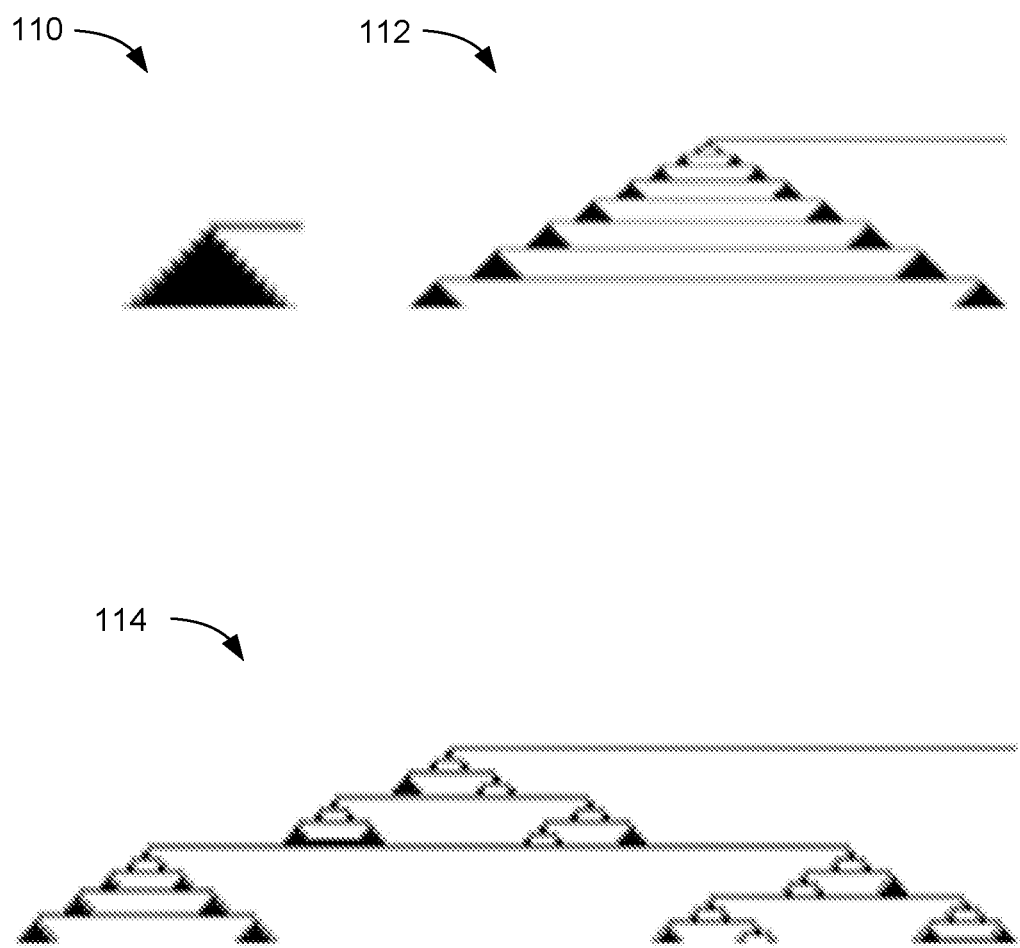
FIG. 1 is a schematic block diagram illustrating a visualization of three different pebbling strategies for 1D pebble games.

Disclosed below are representative embodiments of methods, apparatus, and systems for generating and using lower-level reversible circuit descriptions from higher-level descriptions. Particular embodiments concern quantum computers and involve systems for generating and using lower-level quantum computer circuit descriptions transformed from higher-level descriptions. For example, the discussion below often refers to example quantum computer embodiments and makes reference to quantum-computer-specific terms, such as "qubits". Such usage is for illustrative purposes and is not to be construed as limiting. Instead, it should be understood that the disclosed technology is not limited to quantum computing architectures but is more generally applicable to other reversible circuits and reversible circuit compilation/synthesis tools. For instance, the features described in the particular examples below are applicable to reversible circuits and reversible circuit compilation/synthesis tools generally (e.g., techniques for identifying and re-using bits in a target reversible circuit architecture).

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "account for" and "evaluate" to describe the disclosed technology. These terms are high-level abstractions of the actual operations that are performed. The actual operations that correspond to these terms may vary depending on the particular implementation and are readily discernible by one of ordinary skill in the art.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase. Still further, as used herein, the term "optimiz*" (including variations such as optimization and optimizing) refers to a choice among options under a given scope of decision, and does not imply that an optimized choice is the "best" or "optimum" choice for an expanded scope of decisions.

II. Example Embodiments of the Disclosed Technology

II.A. Introduction to the Disclosed Technology

Arbitrary computations can be carried out by a computational device in such a way that, in principle, each time-step can be reversed, thus allowing recovery of the input from the output of a computation that has been orchestrated in such a fashion.

One of the main applications of reversible computing is quantum computing. Reversible computing can be used in the field of quantum computing as a vehicle that allows a scalable quantum computer to carry out any function that a classical computer might carry out. It should be noted that the ability of computing classical functions is at the core of many interesting quantum algorithms, including Shor's algorithm for discrete log and factoring where the reversible computations are arithmetic operations in suitable algebraic data structures such as rings and fields, and Grover's algorithm for data-base search where the reversible computations are the operations required to implement the predicate that implicitly defines the solution of the search problem at hand. Many variations of this general theme exist, including quantum walk algorithms that traverse graphs faster than classical algorithms can, in some cases even exponentially faster, as well as some algorithms for simulation of Hamiltonians, where reversible computations are desirable for the efficient accessing of the matrix elements of the underlying Hamiltonian.

While these factors may illustrate the desirability for techniques to turn classical computations into quantum circuits, it also serves as an illustration of the difficulties that such a translation presents to a compiler system that aims at supporting this translation from a classical computation that is given (e.g., from a program expressed in a higher-level programming language such as C or Haskell). For example: (i) qubits that are used as intermediate scratch space during the computation are typically cleaned up at the end of the computation; otherwise, the interference effects, on which quantum computations rely heavily, may disappear which would render the computation useless; and (ii) the number of qubits that are needed for scratch space grows linearly with the number of classical instructions if a simple method for turning the irreversible operations into reversible ones is used. One example for a simple method is the so-called Bennett method, which reverses the entirety of all operations of a computation after completion of all operations in the computation. That is, after the original computation has been performed by a sequence of reversible gates, the desired output registers are copied out into a dedicated quantum register, which is then followed by an application of the reversed sequence of the original sequence of reversible gates.

What is more, the simple methods for making circuits reversible are extremely inefficient regarding the load-factor of the computation. In particular, they lead to circuits that only manipulate a tiny subset of the qubits at a given time and leave the bulk of the qubits idle. This is particularly troublesome as many current (and currently planned) quantum computers are very small, and one can neither afford to have a lot of scratch space nor to have qubits that have been used as scratch space (referred to herein as "ancilla qubits" or "ancillas") to sit around for the duration of the computation, only to be cleaned up at the very end of the computation.

As discussed more fully below, time-space trade-offs for reversible computations can be enabled and analyzed using reversible pebble games, which are a method that allows to systematically study the ways to save on scratch space (e.g., ancilla bits, such as ancilla qubits) at the expense of re-computing intermediate results. To determine an improved or "best" pebbling strategy for a particular dependency graph generated from actual real-world programs, however, is a non-trivial matter.

Embodiments of the disclosed technology include various approaches for addressing this time-space trade off. For instance, in certain implementations, pragmatic heuristic-based approaches are employed. Certain embodiments of the disclosed technology employ solutions that work in practice and are able to handle programs at scale. As an example, hash-functions such as SHA-2 are considered and evaluated. Such hash-function can be thought of as a Boolean function $f:0,1^N \rightarrow \{0,1\}^N$, where n=N, that has a very simple and straightforward classical program for its evaluation, has no branchings, and only uses simple Boolean functions such as XOR, AND, and bit rotations, but which has internal state between rounds. The fact that there is state prevents the Boolean function to be decomposed, thereby making purely truth-table or BDD-based synthesis methods useless for this problem. On the other hand, scalable approaches such as combinator-based rewriting of the input program as a classical circuit also run into issues for SHA-2 as the number of rounds is high and because of the large number of scratch qubits per each round, the overall required space by such methods is too high.

There are several programming languages for quantum circuits, including, for example LIQUi|⟩, Quipper, and various other approaches. Quipper offers a method for "lifting" of quantum circuits from classical functions. One difference between the Quipper approach and example embodiments disclosed herein is that certain example embodiments of the disclosed technology do not use the concept of linear logic. The use of linear logic underlies Quipper and other work on quantum lambda calculus. By contrast, embodiments of the disclosed technology make a step in the opposite direction. For instance, for certain example embodiments, space saving potential is created by allowing mutable variables and in-place updates of variables. The absence of a linear type system in embodiments of the disclosed technology does not create a dramatic disadvantage in practice. For instance, one asserted advantage of linear types is that automatic consistency with regards to non-cloning is ensured. However, since embodiments of the disclosed technology focus on subroutines that are classical/reversible, this problem does not present itself.

For embodiments of the disclosed systems that allow mutable variables and in-place updates of variables, it is desirable to provide a mechanism to un-compute qubits that have been used deep inside a computation that might have involved mutable and immutable variables. If for each newly computed result a fresh ancilla qubit is used (as in approaches that do not allow mutable variables and/or in-place updates of variables), this task is relatively straightforward: the ancilla still holds the computed value and in order to un-compute another value based on the ancilla value, the result is still there. However, in an approach with mutable variables and in-place updates of variables (as in embodiments of the disclosed technology), it might have happened that the data in the ancilla itself might have been overwritten. In this case, it is desirable to have a clean way to track back the data in order to be able to recompute it. To this end, embodiments of the disclosed technology introduce a data structure termed the "MDD", which stands for "mutable data dependency graph". The MDD allows this information to be tracked more precisely.

A variety of technical innovations and resulting advantages are introduced by the disclosed technology. Any one or more of these innovations and/or advantages can be exhibited in a particular embodiment. Among the innovations disclosed herein is a method for computing a data structure (the mutable data dependency graph, "MDD") from a given high-level program (e.g., a F# program). This data structure tracks the data flow during a computation and allows for the identification of parts of the data flow where information can be overwritten as well as other parts where information can be un-computed early as it is no longer needed. These two techniques of overwrite, which is implemented using so-called in-place operations, and early cleanup, for which a strategy that can be interpreted as a particular pebble game that is played on the nodes of the data flow graph is used, can be effectively used in embodiments of the disclosed technology.

A variety of cleanup strategies (e.g., for cleaning up ancilla bits during the compilation/synthesis process) are also disclosed, any one or more of which can be used alone or in combination with one another, depending on how aggressively the cleanup is to implemented, to achieve a desired time-space tradeoff.

Also disclosed herein is a compiler (sometimes referred to as "Revs") that can take a program (e.g., from a language that is a subset of F and synthesize one or more corresponding reversible networks (e.g. one or more Toffoli gate sets).

Embodiments of the disclosed technology demonstrate that higher-level reversible compilation/synthesis can be done in a way that is much more space efficient than using the so-called Bennett method, which essentially introduces additional ancillas per each operation used in the irreversible implementation. In example implementations of the disclosed technology for arithmetic operations, such as integer addition and multiplication, as well as hash functions, such as SHA-2 and MD5, space savings over the Bennett method of a factor of 4 or more were observed.

II.B. Reversible Computing

II.B.1. Pebble Games

So-called pebble games illustrate the advantages of re-using bits of a reversible circuit (e.g., qubits of a quantum circuit) early, as with embodiments of the disclosed technology. Although the discussions below proceed with reference to qubits and quantum circuits, it is to be understood that the innovations described are more generally applicable to other reversible circuits and reversible circuit compilation/synthesis tools as well. In some cases, a pebble game can be used to analyze a particular quantum computer architecture and help inform how to improve memory usage (e.g., qubits usage) during the compilation/synthesis process. A simple and easy-to-implement version of a 1-D pebble game is the incremental game. In this pebble game, one simply adds pebbles until one runs out. One can then remove as many pebbles as possible starting at the point where one ran out and use them to continue the computation. A pebble is left behind each time this is done. It is easy to see that for some amount of pebbles $r_i$, one can pebble a distance D or $$D(n) = n + (n-1) + (n-2) + \ldots + 1 = \frac{n(n+1)}{2}.$$

And since one will pebble/unpebble a given node a maximum of 4 times (twice in the forward computation and twice again during clean-up) total amount of computations is worst case 4N where N is the number of irreversible operations.

Incremental clean-up can be thought of as an approximation of this 1-D incremental pebble game and in fact reduces to it in the case of a 1-D MDD. It is possible, however, to implement more complex pebbling strategies.

FIG. 1 is a schematic block diagram 100 illustrating a visualization of three different pebble strategies (strategies 110, 112, 114) that succeed in computing a pebble game on a linear graph, but use different strategies. Time is displayed from left to right, qubits are displayed from bottom to top.

In FIG. 1, different strategies to clean up a computation on a linear 1D graph are visualized. Shown as strategy 110 is the "lazy", or so-called Bennett, clean-up strategy in which for each gate a new ancilla is allocated, used, and kept around for the entire duration of the computation until it finally gets cleaned up in the reverse order. Shown as strategy 114 is another extreme of a strategy that resembles a fractal and manages to pebble the longest possible linear graph with the same number of pebbles as the strategy shown in strategy 110. The increase of the number of nodes in the line graph is exponential compared to strategy 110; however, the increase in the number of time-steps compared to strategy 110 is also exponential. The strategy shown in strategy 112 is a middle-ground between these two extremes in that the increase of the number of ancillas needed to carry out the strategy is only a constant factor, whereas the time increase to implement the strategy is only a square root of the time of the corresponding irreversible program.

Figure 2:
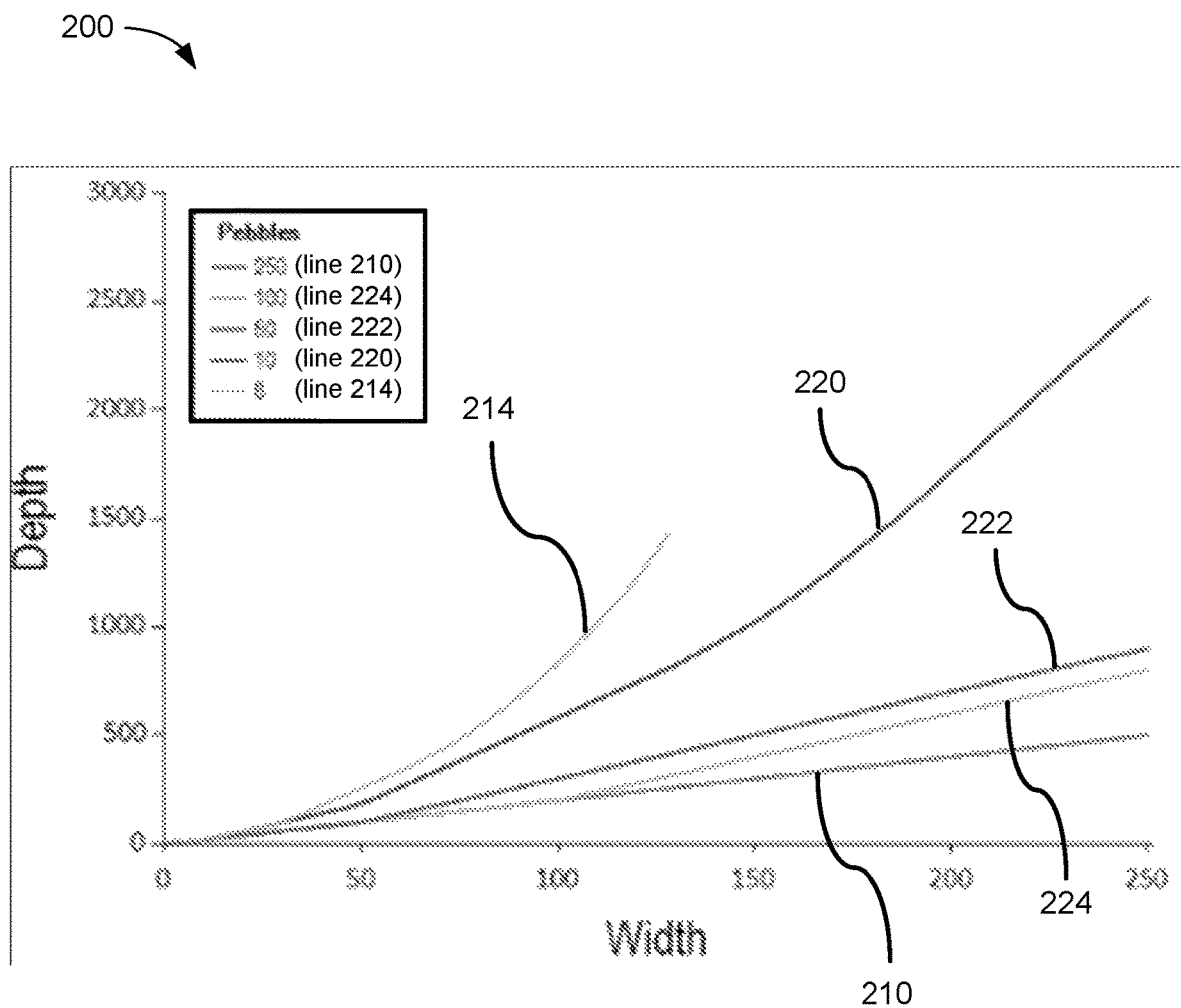
FIG. 2 shows a graph representing a comparison of the asymptotic scaling of different pebbling strategies for 1D pebble games.

Using dynamic programming, a search for optimal pebbling strategies on 1-D graphs for a variety of different space constraints can be implemented. The findings for one such search are summarized in the plot shown in FIG. 2. In particular, FIG. 2 shows a graph 200 representing a comparison of the asymptotic scaling of different pebbling strategies. In the graph 200, the uppermost curve 214 corresponds to the pebble games shown in strategy 114 of FIG. 1, which exhibits the fastest growth in terms of achievable depth of the computation but which comes at the price of also increasing the width (corresponding to the number of qubits) significantly. The lowermost curve 210 is for the strategy 110 shown in FIG. 1 (corresponding to the so-called "Bennett" strategy) in which the number of ancillas scales linearly with the depth of the circuit. Also shown are curves 220, 222, 224 for various other strategies that are optimal for given space resource constraints. The total number of available ancillas/pebbles is bounded by 8 in curve 214, by 10 in curve 220, by 50 in curve 222, by 100 in curve 224, and by 250 in curve 210.

In summary, FIG. 2 shows that for the dynamic programming search for 1D pebble game under the given space constraints, a significant reduction of the number of "pebbles" (corresponding to qubits of a target quantum computer architecture in practice) by a factor of 4 or more leads to an almost negligible increase in the length of the reversible computation. Parsimonious strategies like those illustrated by curve 214 that achieve a pebbling of a 1D line graph of size $r_i$ with O(log(n)) pebbles are not advisable for some practical situations as the circuit size increases dramatically. Instead, for many practical situations, and in accordance with embodiments of the disclosed technology, a middle ground is desirable. By using such middle-ground approaches, compilation for a quantum circuit can be performed in a manner that provide a reduction in terms of the number of qubits used (pebbles) and which then leads to only a small increase in circuit size and compilation time.

The cleanup strategies disclosed below can be thought of as pebble games that are played on finite graphs, namely the dependency graphs of the functions that are computed by an input program.

II.B.2. In-Place Versus Out-of-Place

An operation is considered to be "in-place" if it modifies data without creating any ancilla. For example, the CNOT gate performs the operation $(a,b) \mapsto (a, a \oplus b)$. So, if one wishes to perform the operation $a \oplus b$ and does not require b later in the circuit, an additional ancilla is not needed to store the output.

The concept of in-place operations is to be distinguished from the concept of "out-of-place" operations in which all inputs are preserved and the result of the computation is stored in a new set of ancillas. Typically, out-of-place operations are the only available option, in particular if no further analysis of the underlying function is performed or if the underlying function is not amenable to an in-place implementation. An illustrative example that generalizes the example of a CNOT operation on a single bit to an operation on a more complex type is the integer addition operation. There is a way to perform an integer addition in-place, namely using a circuit that implements $(a,b) \mapsto (a, a+b)$, where a is an n-bit integer and b is an (n+1)-bit integer and a+b is an (n+1)-bit integer that stores the result of the addition operation. In this case it would have been possible to use an out-of-place operation also which would have mapped $(a,b,0) \mapsto (a, b, a+b)$, which means that the inputs would have been preserved and the output would have been written into a new ancilla qubit. Depending on the context it may or may not be preferable to use an in-place operation versus an out-of-place operation, the potential trade-offs arise from the complexity of in-place operations being typically somewhat higher than their out-of-place pendants.

Also, the input b might be needed elsewhere in the computation which may be reason to choose an out-of-place operation in specific contexts.

II.B.3. Boolean Functions

A special case of programs that is desirably turned into reversible circuits are Boolean functions. Boolean functions are used as the primitives in example implementations of the disclosed technology. For example, supported Boolean operators are converted into AND/XOR functions and grouped into Boolean expressions. The expressions are then converted into Toffoli/CNOT circuits while attempting to reduce (e.g., minimize) ancilla use. This can be done by combining operations into expressions of the type:

type BoolExp=
  |BVar of int
  |BAnd of BoolExp list
  |BXor of BooExp list

Expressions are given a target to be evaluated onto. For example, a "BXor" (XOR) term can be constructed by evaluating each term then adding a CNOT from each of them to a given target. Further, a "Band" (AND) term can be constructed using a multiple control Toffoli decomposition targeted again to the given target. This means ancilla usage is limited to the qubits required to perform all of the AND operations in the expression.

The output of the operation is $t \oplus e$, where t is the target qubit and e is the expression. This can be useful when building in-place operations. If one just wishes to evaluate the expression, t can be initialized as an ancilla giving $0 \oplus e = e$.

It is possible to do further optimization by factoring the expression in an attempt to remove AND operations. For example $ab \oplus ac \oplus bc$ can be factored as $a(b \oplus c) \oplus bc$ so that it uses two AND operations rather than three. Currently there is no automated factoring but if the expression is written in a factored form by the programmer it will result in better circuit generation.

II.C. Example Compiler Embodiments for Reversible Circuits

II.C.1. Dependency Analysis

Analyzing the dependencies between the instructions in a basic function, between functions, and/or between larger units of code is a desirable function of a compiler. Dependency analysis can comprise, for example, identifying basic units of codes and identifying them with nodes in a directed acyclic graph ("DAG"). The directed edges in the graph are the dependencies between the basic units (e.g., anything that might constrain the execution order, including for instance control dependencies that arise from the control flow in the program which in turn can be for instance branching that happen conditional on the value of a variable or, more simply, the causal dependencies that arise from one unit having to wait for the output of another unit before the computation can proceed).

In certain example embodiments of the disclosed technology, a dependency graph is generated that can be generalized to two main processes. First, the compiler is invoked to generate an abstract syntax tree (AST) for the input program (e.g., an F# program or other high-level program describing desired circuit functionality). For instance, for an F# program, this is done using the mechanism of reflection for which F# offers support in the form of so-called quotations. Quotations have a simple syntax by surrounding expressions for which an abstract syntax expression is to be constructed with <@ . . . @>. F# quotations are types which imply that much of the type information present in the program as well as the expression based nature can be leveraged. In practice, this means that the AST will already be represented in a form that can then be easily dispatched over by using one or more match statements for the various constructors that might be used. Second, active patterns in match statements are used to further aid with the process of walking the AST and turning it into an internal representation that represents the dependency graph of the program.

In accordance with certain example embodiments of the disclosed technology, the nodes of the resulting dependency graph capture the control flow and data dependencies between expressions, but also identify which blocks can be computed by in-place operations and which blocks have to be computed by out-of-place operations. Because this latter feature is related to which elements of the dependency graph are mutable and which are not, this data structure is referred to herein as the "Mutable Data Dependency" graph or "MDD". In particular implementations, the one or more parts of the code that can be computed by in-place operation are inferred by: (1) evaluating which variables are labeled in F# as mutable; and/or (2) using external knowledge (e.g., from a library of known operations for particular expressions) about whether for an expression involving these variables an in-place computation implementation is actually known. An example for the latter is the addition operation for which, as described below, either an in-place implementation (a,b) ↦ (a, a+b) or an out-of-place implementation (a,b,0) ↦ (a,b, a+b) can be selected.

In general, and according to certain example embodiments, the nodes of the MDD correspond to inputs, computations, initialized bits, and cleaned-up bits. Input nodes can correspond to individual variables but also to entire arrays which are also represented as a single node and treated atomically. Computation nodes correspond to an expression that occurs in the program and that manipulates the data. Initialized and cleaned-up bits correspond to bits that are part of the computation and which can be used either as ancillas (ancilla bits or qubits) or to hold the actual final output of the computation. Initialization implies that those qubits are in the logical state 0 and the cleaned-up state means these bits are known to be returned back in the state 0.

In particular embodiments of the disclosed technology, the directed edges in a MDD come in two different kinds of flavors: data dependencies and mutations. Data dependencies are denoted by dashed arrows and represent any data dependency that one expression might have in relation to any other expression. Mutations are denoted by solid arrows and represent parts of the program that are changed during the computation. In practice, dashed arrows and solid arrows may be represented in the graph itself in a variety of manners. For instance, the graph may include a field or other data indication for an edge identifying the edge as a data dependent edge or mutable edge. For ease of illustrating the disclosed technology, however, the discussion herein and the figures will proceed with reference to "dashed" arrows and "solid" arrows.

By tracking the flow of the mutations, one can determine the scheduling of the expressions onto reversible operations and re-use a pool of available ancillas which helps to reduce the overall space requirements of the computation, in some cases even drastically so. Table 1 shows pseudocode of an example process for computing the MDD from the AST produced by, in the illustrated case, an F# compiler.

TABLE 1

Example Implementation for Computing MDD

Require: AST : The AST of a function to be compiled
1: procedure RESOLVEAST(AST,G)
2:     if Root of AST is an operation then
3:         for input in inputs(AST) do
4:             inputIndex , G ← ResolveAST(input,G)
5:             inputIndices ← inputIndex :: inputsIndices
6:         end for
7:         newNode.type ← OpType(head(AST))
8:         newNode.inputs ← addInputArrows(inputIndices)
9:         G ← AddNode(newNode)
10:        return getIndex(newNode) , G
11:    else
12:        return getVarIndex(head(AST)) , G
13:    end if
14: end procedure
15: G ← Add nodes for all inputs
16: resolveAST(AST,G)

In accordance with one embodiment of the disclosed technology, when resolving the AST of a function, each node will either be another function or an input variable. If the node is a function, the example process illustrated in Table 1 recursively computes the AST for all of the function inputs adding the results to the graph. Upon doing so, the index numbers of these results are used as the inputs for the operation and then the operation is added to the graph. If the node is a variable, the example process illustrated in Table 1 looks up the node's name in a map of currently defined variables and returns an index to its node. The type of the operation determines which arrows will be solid input arrows and which will be data dependencies (controls).

Figure 4:
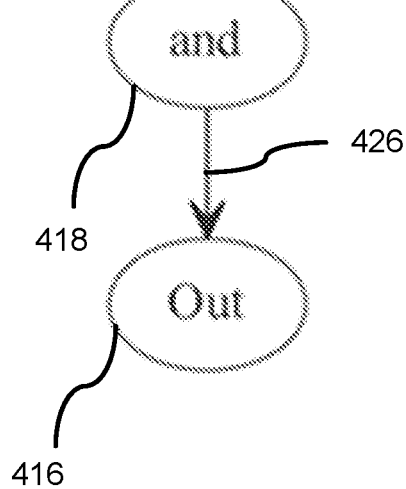
FIG. 4 shows a first example MDD graph for the program of FIG. 3.
Figures 5, 6:
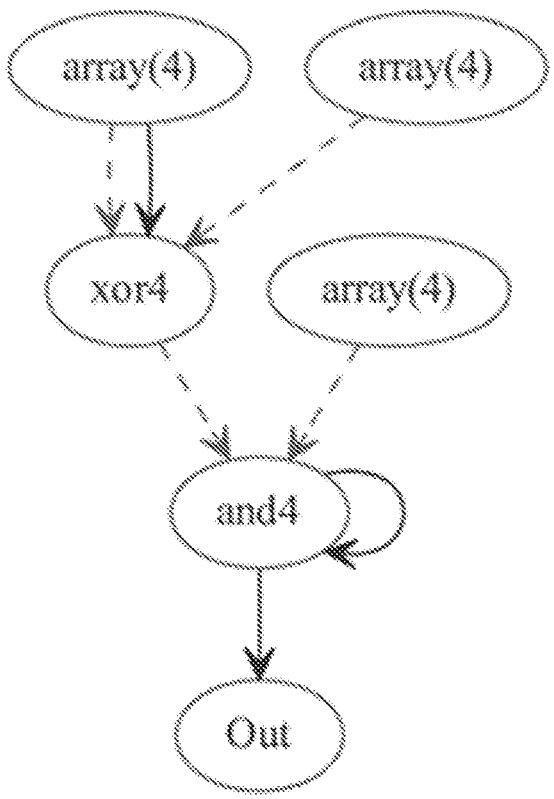
FIG. 5 shows a second example program to be compiled/synthesized using embodiments of the disclosed technology.
FIG. 6 shows a second example MDD graph for the program of FIG. 5.
Figure 8:
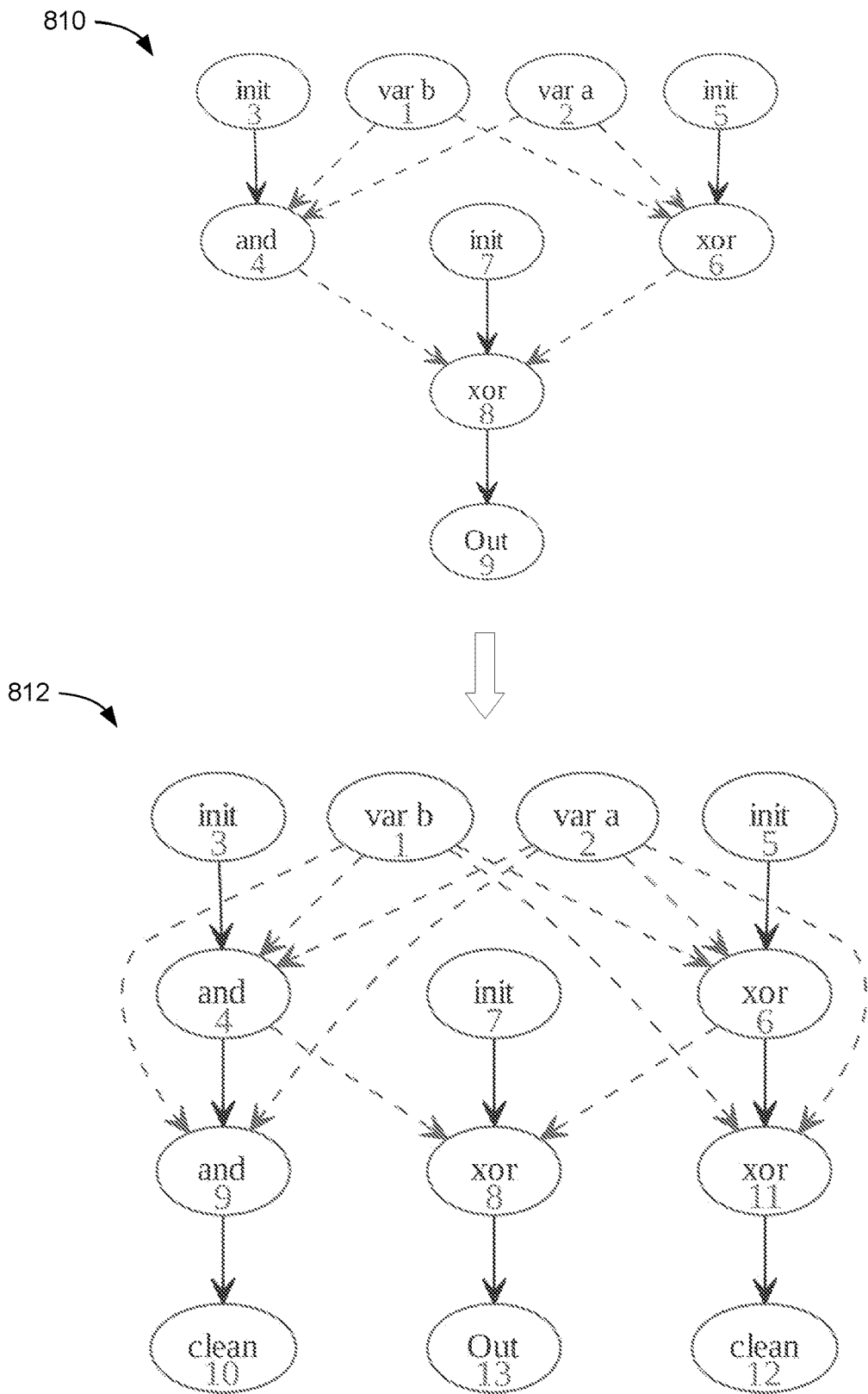
FIG. 8 shows third example MDD graphs for one of the functions $f$ of the program of FIG. 7, and includes MDD graphs before and after an example clean-up strategy is applied.

In the examples illustrated in FIGS. 4, 6, and 8, the paths from inputs to outputs that indicate modifications are drawn using solid arrows, whereas controls are shown as dashed arrows. Because the process visits each node in the AST and does a modification of the graph that involves only a constant number of elements, the overall runtime of the process illustrated in Table 1 is O(n), where n is the number of nodes in the AST.

To illustrate the translation process described by Table 1, consider the program below and also illustrated as program 300 in FIG. 3.

let f a b=a && b

In this program, ƒ is simply the AND function of two inputs a and b.

FIG. 4 is a schematic block diagram 400 showing the MDD corresponding to this (the program of FIG. 3) produced according to the process of Table 1. In particular, FIG. 4 is the MDD for ƒ(a,b)=a∧b As illustrated in FIG. 4, there are two input nodes in the MDD for ƒ labeled as "var a" (node 410) and "var b" (node 412). Those nodes are immutable. Furthermore, there is one node initialized in a "0" state, denoted as "init" (node 414) and one node which will contain the final output, denoted as "Out" (node 416). Data dependencies are present in the node for the AND operation, meaning that a node for the AND operation is created (node 418) and (dashed) input arrows pointing from the variables a and b are added (dashed arrows 420, 422). The node "init" is used to hold the result. It points to the operation with a solid modification arrow (solid arrow 424). Finally an output node is added showing which value is being treated as the output of the function (node 416) along with a solid modification arrow (solid arrow 426).

In one example embodiment, the final code emission by the compiler in this concrete case will use a library for Boolean expressions which is invoked when mapping the MDD to a reversible circuit. The resulting circuit corresponding to this particular input program can be a single Toffoli gate with control qubits a and b and one target qubit.

A slightly more involved example is given by the code portion 500 shown in FIG. 5. In particular, FIG. 5 shows a F# snippet 500 using arrays and in place operations. The mutable data dependency (MDD) graph corresponding to the "and 4" function shown in FIG. 5 is illustrated in graph 600 of FIG. 6

Figure 3:
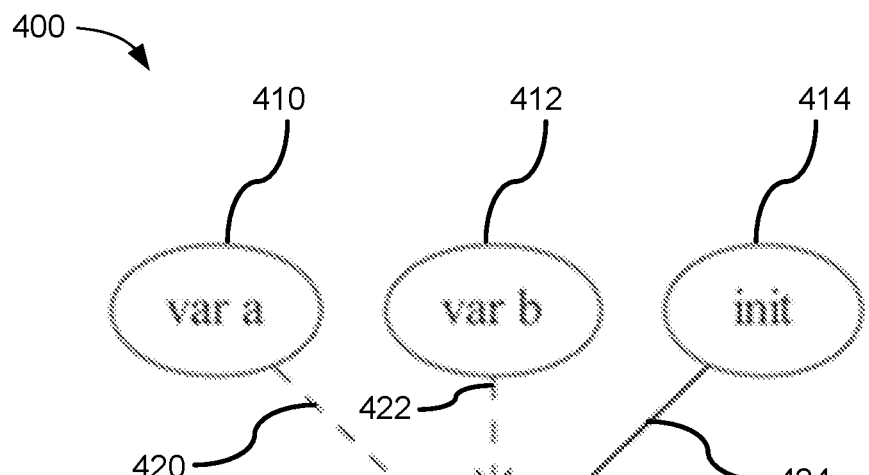
FIG. 3 shows a first example program to be compiled/synthesized using embodiments of the disclosed technology.

In FIG. 5, there are several new elements as compared to the Boolean example of FIG. 3 that illustrate further aspects of the MDD graph construction. First, a number of arrays are used to store data in a way that allows for easy access and indexing. Note that, in this example and in F# (which is used as the input program language for example purposes), the type array is inherited from the .NET array type and by definition is a mutable type. This information is used when the MDD for the program is constructed, as the example compiler discussed herein (Revs) knows that in principle the values in the array can be updated and overwritten. Whether this is actually leveraged when compiling a reversible circuit depends on other factors as well, namely whether the parts of the data that is invoked in assignments (denoted by "<-") is used at a later stage in the program, in which case the data might have to be recomputed. Note further that there are basic control flow elements such as "for" loops and function calls and Boolean connectives, namely the AND function that was already discussed in the previous example, and the XOR function, denoted by "< >". The MDD corresponding to the main function "and 4" is shown in graph 600 in FIG. 6.

II.D. Clean-Up Strategies

If a node has no outgoing modification arrows (solid arrows) and all operations pointed to it by its dependency arrows have been completed, it is no longer needed by the computation and may be cleaned. This section discloses example clean-up strategies that can be used by a compiler to identify ancilla bits for a particular program that can be cleaned up and potentially re-used prior to all computations for the particular program being performed. Thus, the example clean-up strategies can be used in space-constrained situations to clean-up ancilla bits (e.g., ancilla bits) for re-use for other functions in a given program. Although the discussions below proceed with reference to qubits and quantum circuits, it is to be understood that the innovations described are more generally applicable to other reversible circuits as well.

The consideration of space constraints during compilation (e.g., the consideration of the limited number of bitsa or qubits) and the realization of circuit designs that implement clean-up strategies prior to computation completion represent significant departures from other compilation approaches. For example, other compilation approaches do not provide any consideration for space constraints and further implement a rudimentary cleaning-up scheme in which ancilla bits (qubits) are cleaned-up only upon completion of all functions in a computation described by a particular input program and/or upon results of the computation being copied out of the quantum computer.

II.D.1. Eager Clean-Up

According to one example embodiment of an eager clean-up scheme, the process begins at the end of the MDD graph (e.g., the MDD graph as described above) and works backward in topological order. When a node (denoted, for discussion purposes, as node A) is found which does not have an outgoing modification arrow, the node furthest along in topological order which depends on it is found (denoted as node B). Inputs (e.g., all inputs) in the modification path of A are then considered. If any of the inputs have outgoing modification arrows pointing to levels previous to B, it is determined that the bit cannot be cleaned up using the eager clean-up scheme since its inputs are no longer available. If the inputs do not have modification arrows pointing at levels previous to B, it can be cleaned up (e.g., immediately cleaned up, meaning in the next available time step, or cleaned up at a later time step) by reversing all operations along its modification path.

For instance, code portion 700 of FIG. 7 shows example F# code that includes a function f for variables a and b. In particular, the function f of FIG. 7 computes the Boolean OR of variables a and b. The Boolean OR can be represented as ab⊕a⊕b (where ab represents the Boolean AND of a and b, and ⊕ is the XOR operation (AND and XOR operations are typically easier to implement as part of a Toffoli network)).

FIG. 8 shows an MDD graph 810 as produced by the process in Table 1 for the function f before application of the example eager clean-up scheme, and a graph 812 as modified by the example eager clean-up scheme illustrated in Table 2 below. In particular, graph 810 of FIG. 8 shows the mutable data dependency graph for a∥b which is represented as ab⊕a⊕b, and graph 812 shows a graph 812 upon application of an example eager clean-up scheme, as illustrated below in Table 2.

The nodes in 810 are labeled by an admissible topological order, which is then processed in reverse (starting from the node with the highest index). Starting from the bottom (the highest index and gradually reducing the index), the example eager clean-up scheme tries to find a node that has no outgoing modification arrows and that is neither an input node nor an output node. The first candidate is node 8, but it has an outgoing modification arrow. The lowest index which is neither an input variable nor an output and does not have any outgoing modification arrows is the XOR at node 6. In line 3 of the example process shown in Table 2 below, the example eager clean-up scheme next computes the last dependent node of 6 which is the XOR at 8. The modification path of 6 computed in line 4 is simply the path from 5 to 6. This path depends only on the input nodes "var a" and "var b", which are not being modified after 6. Hence the if branch in line 7 catches and the example eager clean-up scheme is therefore able to insert nodes after node 8 to cleanup node 6. The nodes inserted by the example eager clean-up scheme are numbered 11 and 12 in the final graph (graph 812). They are initially numbered 9 and 10, but when cleanup is performed on the left side for node 4 in a similar fashion as for node 6, the example process again inserts the nodes after node 8, moving the indices of the previously inserted nodes up by 2.

Figure 9:
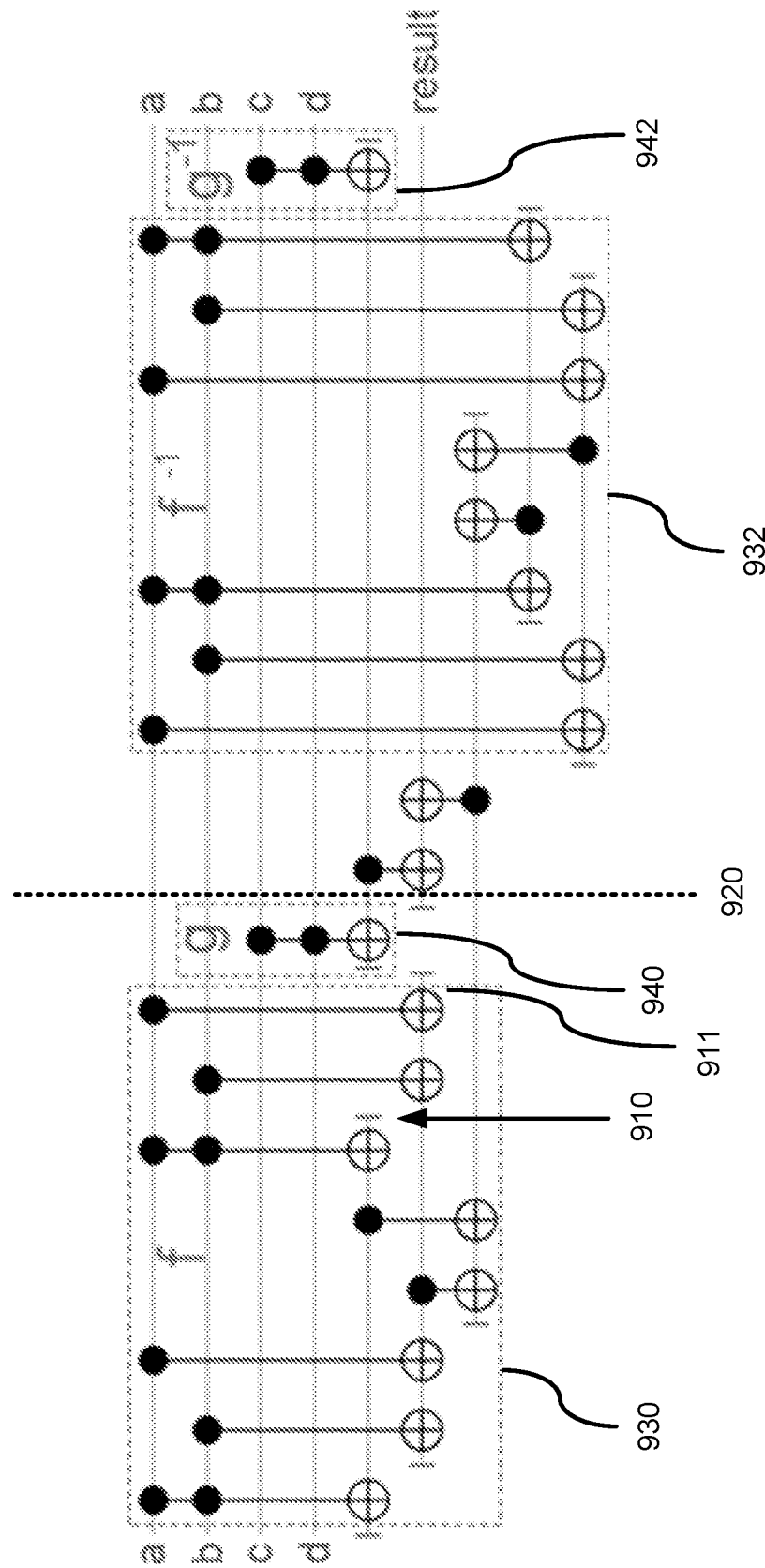
FIG. 9 is a circuit graph for the entire program of FIG. 7 as modified by an example eager clean-up scheme.

Further, FIG. 9 is a circuit graph 900 for the function h as modified by the example eager clean-up scheme of Table 2. In this illustrated example, the values initialized to hold the results of ab and a⊕b are no longer required after they are used to calculate the final result. In accordance with one example embodiment of an eager clean-up scheme, the compiler notices that the original values used to produce them are still available and un-computes ("frees" or "cleans up") the extra ancilla. Accordingly, and as shown in the circuit graph of this operation in FIG. 9, the freed ancilla can be reused in the other parts of the computation. In particular, FIG. 9 shows the freed ancilla at ancilla bit 910. There is another ancilla bit that is freed up early, namely the ancilla at ancilla bit 911. By contrast, using the Bennett method, no ancilla qubits would be un-computed ("freed" or "cleaned up") until after completion of all operations of the computation (after the results are copied out). For instance, and with reference to FIG. 9, the Bennett method would not clean up any ancilla bits prior to completion of the computations of functions f and g (the completion of which is illustrated by dashed line 920).

In certain example embodiments, ancilla bits currently in use are tracked during circuit generation using a heap data structure. Whenever an ancilla is needed during the compilation from the MDD into a circuit, an identifier (implemented as a number) is taken off the heap and the bit matching that number is used. After a bit has been cleaned up, the corresponding identifier is pushed back onto the heap. This allows ancilla to be reused and ensures that only the minimum indexed ancllia are used so that allocating unneeded space can be avoided. In other embodiments, the heap data structure is used to track all qubits of a particular quantum computer and the allocation of such qubits during the compilation/synthesis process. As ancilla bits are used, and made available again upon recognizing that they can be re-used as disclosed herein, they can be taken off and returned to the head data structure.

This example illustrates several notable features of the disclosed technology. First, note that like the other examples in this paper, the illustrated F# program can be compiled and executed on a classical computer just like any other F# program. By putting quotations around the program and sending it to the "Revs" compiler (which implements the example MDD generation process illustrated in Table 1), another semantic interpretation of the same program can be created, namely one that can be mapped to a reversible network. As can be seen in FIG. 8, operations on the same level can be reordered or even performed in parallel without changing the outcome of the computation. Finally, the Toffoli network emitted by the compiler at the back-end (in the circuit generation phase) is shown in FIG. 9.

More specifically, FIG. 9 shows the resulting reversible network for computing the function h(a,b,c,d)=f(a,b)⊕g(c, d). The sub-circuit 930 labeled with "f" is obtained from the MDD shown in FIG. 8. Similarly, a sub-circuit 940 for g is obtained from an MDD for g, which is an AND function. The final result is copied out into the "result" wire and then cleanup is performed by running the circuits for f and g in reverse (shown as reverse sub-circuit 932 for function "f", and reverse sub-circuit 934 for function "g"). Notice that re-use of ancillas is possible as a result of the eager cleanup that was applied: the first 2 of the 3 ancillas used in the computation of f are freed up after the first stage (shown at post-cleanup points 910, 912) and are reused by g. This leads to an overall qubit count of 9.

It may not always be possible or desirable to do clean-up eagerly. The basic reason for this is that the computation might result in the production of bits which are not needed in the future execution path of the circuit but which also cannot be easily cleaned up as they themselves were the result of another computation. A simple example of this situation is shown in code 1000 of FIG. 10.

Figures 10, 11:
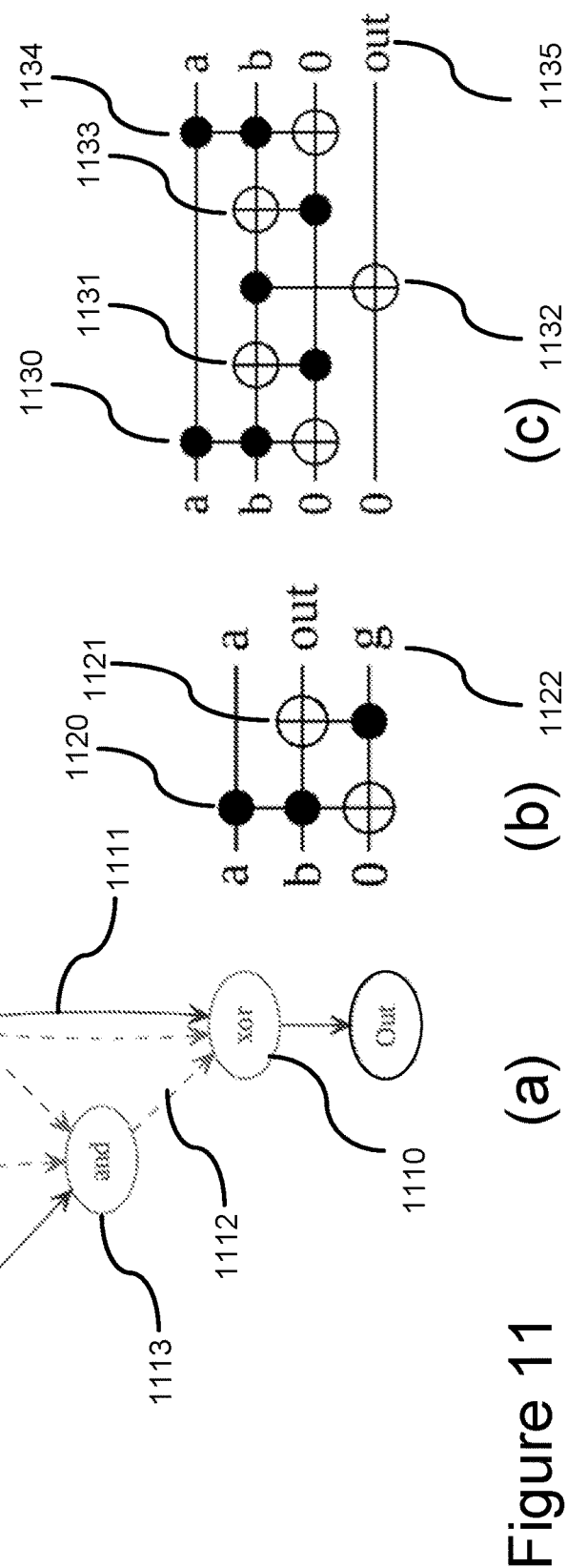
FIG. 10 shows a fourth example program to be compiled/synthesized using embodiments of the disclosed technology
FIG. 11 shows a fourth example MDD graph and associated circuit graphs for the program of FIG. 10.

In FIG. 10, the variable $C$ is the result of a non-trivial computation and is then part of a subsequent computation that involves updating yet another variable b in a mutable update path. The corresponding MDD 1100 is shown in FIG. 11.

FIG. 11(a) illustrates an example graph where a value is initialized to store the result of the AND operation but cannot be cleared even though it is no longer needed in the computation. The reason for this is that the node performing the XOR computation depends on the result of the AND operation, as indicated by the dashed arrow (dashed arrow 1112), and the original value of the variable b before it was mutated. FIG. 11(b) shows the quantum circuit that corresponds to the MDD shown in FIG. 11(a). The inputs are denoted by "a" and "b", the AND operation 1113 corresponds to the Toffoli gate 1120 which stores the result of the AND computation in a new qubit shown as value "g" in 1122, the XOR operation 1110 corresponds to the CNOT gate 1121. The issue is now that the AND node 1113 cannot be cleaned up eagerly; indeed, cleaning up of the AND node would mean to un-compute the value "g" 1122 which would imply the application of another Toffoli gate to reset 1122 into the "0" state. However, this is not possible as the original value of "b" is no longer present: it has been overwritten by the application of the XOR gate 1110. Hence the fact that there was a mutation arrow 1111 pointing to a node that depends on the result of the AND operation 1113 as indicated by the dashed arrow 1112 creates an obstacle to eager cleanup. The resolution of this situation is shown in FIG. 11(c). As shown in FIG. 11(c), instead of eagerly cleaning up the result of the AND function 1122, the output result is copied using a CNOT gate 1132 onto a new ancilla which serves as an output wire 1135. The initial phase of the computation is identical to that in FIG. 11(b) in that 1130 corresponds to 1120, and 1131 corresponds to 1121. After the CNOT gate 1132, then a Bennett-style cleanup is performed on the entire circuit by reversing gates 1130 and 1131 leading to the CNOT gate 1133 and the Toffoli gate 1134.

Situations like the one in FIG. 11(a) can be identified in the MDD graph as finding (undirected) cycles involving at least one solid edge. If a case like this occurs, the function will not be fully cleaned. To resolve this, the result can be copied out and the function reversed. The node corresponding to the AND gate 1113 is an example for a node that will be marked as "uncleanNode" by Algorithm 2 in program line 10, which is how the nodes are identified for which a Bennett-style cleanup has to be applied.

TABLE 2

Example Implementation for Performing Eager Cleanup of an MDD

Require: An MDD G in reverse topological order, subroutines
LastDependentNode, ModificationPath, InputNodes.
1: for node in G do
2:    if modificationArrows(node) = ∅ then
3:        dIndex ← LastDependentNode of node in G
4:        path ← ModificationPath of node in G
5:        input ← InputNodes of path in G
6:        if None (modificationArrows input) ≥ dIndex then
7:            cleanUp ← (Reverse path) ++ cleanNode
8:        end if
9:    else
10:        cleanUp ← uncleanNode
11:        G ← Insert cleanUp Into G After dIndex
12:    end if
13: end for
14: return G A pseudocode implementation of an example approach to performing eager cleanup is given in Table 2. As shown by the pseudocode, the process takes a graph in reverse topological order and tries to find a node that does not modify any nodes that come after it in reverse topological order, so that this node can be safely cleaned up. As finding such a node involves checking all nodes that might influence its value along the modification path to which it belongs, which in itself might take a linear time O(n) of checks, where $r_i$ is the input size as measured by the number of nodes in the initial MDD G, an overall worst-case running time of $O(n^2)$ is obtained for this process.

The example clean-up process in Table 2 uses three subroutines: (1) LastDependentNode(node, G) (defined to be the index of the last node topologically in a sorted graph G which depends on node); (2) ModificationPath(node, G) (defined as the path made up of the mutation arrows from initialization to $G_i$); and (3) InputNodes(path, G) (defined as the set of all input nodes into a path).

As discussed above, there are cases in which eager cleanup is not possible (e.g., where the IF statement in line 6 of the pseudo code, as shown above, does not apply). This happens if there are modification arrows greater than the index of the last dependent node in the input (meaning that the input has changed before eager cleanup can be done, and eager cleanup is not possible (this is as in the example in FIG. 11(a))). In this case, and according to certain embodiments, the results are copied out and the function is reversed for a full cleanup. In such embodiments, this is marked by the attribute "uncleanNode" when the ELSE branch in line 10 in the example pseudocode of Table 2 is executed. In this case, during the final circuit emission phase which involves walking the modified MDD G that is returned by the pseudocode of Table 2, the unclean nodes are processed by copying out the result and cleaning up as in the Bennett strategy.

II.D.2. Incremental Clean-Up

In certain embodiments, an incremental clean-up scheme is used. For example, in accordance with one exemplary scheme, the pool of available ancilla bits can be accounted for (e.g., monitored by an ancilla management component) and when the pool of available ancillas is running low (e.g., below a predefined threshold), the compiler looks ahead in the graph (e.g., the MDD graph) to check which ones of the currently allocated bits can be re-used for future computation in the program. The parts of the circuit corresponding to the identified bits can then be reversed, thereby creating a checkpoint by copying out the one or more bits that can be used for future computations in the program. This can be done until the pool of available ancilla bits exceeds the threshold (or exceeds a second threshold higher than the initial threshold). If, at a later stage during the compilation process, the pool of available ancilla bits again runs low, the process can be repeated by taking the last checkpoint to be the beginning of the circuit. In order to clean up the checkpoints, the result of the function may be copied out after which the function can be reversed.

A pseudocode implementation of an example process for performing such an incremental clean-up scheme is shown in Table 3.

TABLE 3

Example Implementation for Performing Incremental Cleanup of MDD

Require: A dependency graph G in topological order, $N_q$ number of unused qubits remaining, n index of the current node, $c_p$ previous checkpoint index, 0 if no previous exists.
1:  $c_{nodes} \leftarrow \{v \in G[c_p..n]$ that have edge to a node $> n)\}$
2:  if Length($c_{nodes}$) ≥ $N_q$ then
3:      $c_{anc} \leftarrow$ AllocateBits(length $c_n$)
4:      G $\leftarrow$ Add Copy from $c_{nodes}$ to $c_{anc}$ into G after n
5:      G $\leftarrow$ Insert (Reverse G[$c_p$..n]) into G after (n + length $c_{nodes}$)

TABLE 3-continued

Example Implementation for Performing Incremental Cleanup of MDD

6:      $c_p \leftarrow$ n + length $C_{nodes}$
7:  end if
8:  return G

II.E. Experimental Data

II.E.1. Arithmetic Functions

One arithmetic operation that is commonly used (e.g. as a basic building block to implement the operations required for Shor's algorithm for integer factorization) is integer addition. There are optimized implementations of adders known for various design criteria, including overall circuit depth and overall number of ancillas.

In this section, results are discussed from an example embodiment of a compiler implemented according to the disclosed technology (the "Revs" compiler) where different clean-up strategies as introduced above were used. The Revs compiler was applied to a classical (non-reversible) implementation of an adder while using different cleanup strategies. More specifically, a space-optimized carry ripple circuit was compiled that implements (a,b,0)↦ (a, b, a+b) whose total number of Toffoli gates for $r_i$-bit addition modulo $2^n$ scales as 4n−2 and that requires 3n+1 qubits. FIG. 12 shows the F# program that implements the carry ripple adder considered. In particular, FIG. 12 is a diagram 1200 showing a carry ripple adder using a simple FOR loop while maintaining a running carry.

Theoretically optimized circuits for implementing carry ripple adders reversibly were compared to the output generated by the Revs compiler. To this end, a simple carry ripple adder in F# as shown in FIG. 12 was implemented. Note that this is a regular F# program that can be compiled (e.g. into an executable and run on a conventional computer). Adding reflections allowed the Revs compiler to use the same piece of code and generate an AST, generate the corresponding MDD, apply a given cleanup strategy, and emit a corresponding Toffoli network for use in a quantum computer. The Revs compiler was applied for two example cleanup strategies—namely, the so-called Bennett strategy that is oblivious to the dependency structure of the program, and the eager cleanup strategy that uses the dependency information present in the MDD and tries to cleanup as soon as a variable is no longer needed.

The results of the comparison are summarized in Table 4 and illustrated in graphs 1310, 1312 in FIG. 13. The main finding is that the output produced by the Revs compiler is within a constant of the theoretically optimized function, both, for the overall circuit size and the overall number of qubits. Moreover, it turns out that applying the Bennett strategy leads to sub-optimal scaling in terms of the total number of qubits, whereas the number of gates turns out to be the same for all three kinds of adders. The classical implementation of the adder is the F# program shown in FIG. 12, which is then automatically compiled into a Toffoli network using Revs using a flag for either the Bennett or the eager cleanup strategy.

TABLE 4

| | Optimized | | Bennett Cleanup | | | Eager Cleanup | | |
|---|---|---|---|---|---|---|---|---|
| n | #gates | #qubits | #gates | #qubits | time | #gates | #qubits | time |
| 10 | 34 | 31 | 34 | 49 | 1.0839 | 34 | 40 | 1.1424 |
| 15 | 54 | 46 | 54 | 74 | 3.4376 | 54 | 60 | 3.1528 |
| 20 | 74 | 61 | 74 | 99 | 6.2899 | 74 | 80 | 6.0110 |
| 25 | 94 | 76 | 94 | 124 | 9.6279 | 94 | 100 | 9.9579 |
| 30 | 114 | 91 | 114 | 149 | 13.7184 | 114 | 120 | 14.6819 |
| 35 | 134 | 106 | 134 | 174 | 18.5229 | 134 | 140 | 20.2778 |
| 40 | 154 | 121 | 154 | 199 | 24.0361 | 154 | 160 | 26.8392 |

In more detail, Table 4 shows a comparison of different compilation strategies for $r_t$-bit adders. The optimization criterion is overall circuit size. Shown are the results for a theoretically optimized carry ripple adder, an adder that results from applying the Revs compiler with a cleanup strategy corresponding to Bennett's method, and an adder that results from applying the Revs compiler with the eager cleanup strategy. Observe that while the total number of gates is the same for all three, the eager cleanup method comes within a space overhead of roughly 33% over the theoretically optimized adder which is better than the overhead of roughly 66% for Bennett's method over the optimized adder.

Further, in more detail, FIG. 14 shows a comparison of the resources required to implement carry ripple adders of $r_t$-bit integers as a reversible circuit. The adders are out-of-place adders (they map $(a, b, 0) \mapsto (a, b, a+b)$, where the addition is performed in the integers modulo $2^n$ (the final carry is ignored)). Shown in graph 1410 is the total size of the circuit, as measured by the total number of Toffoli gates needed in the implementation. Shown in graph 1412 is the total number of qubits, including the two input registers, the output register, and the used ancillas.

Additionally, a depth-optimized adder was considered that implements integer $r_t$-bit addition modulo $2^n$ in $5n-w(n-1)-3\lfloor \lg(n-1) \rfloor -6$ Toffoli gates, where $w(k)$ denotes the Hamming weight of an integer k. The number of qubit required for this adder scales as $4n-w(n-1)-\lfloor \lg(n-1) \rfloor -1$. The results of the comparison are shown in graph 1410, 1412 of FIG. 14.

In more detail, FIG. 14 shows a comparison of the resources required to implement depth-optimized adders of $r_t$-bit integers as a reversible circuit. The adders are out-of-place adders (they map $(a, b, 0) \mapsto (a, b, a+b)$, where the addition is performed in the integers modulo $2^n$ (the final carry is ignored)). Shown in graph 1410 is the total size of the circuit, as measured by the total number of Toffoli gates needed in the implementation. Shown in graph 1412 is the total number of qubits, including the two input registers, the output register, and the used ancillas.

II.E.2. Hash Functions

Figures 15, 16:
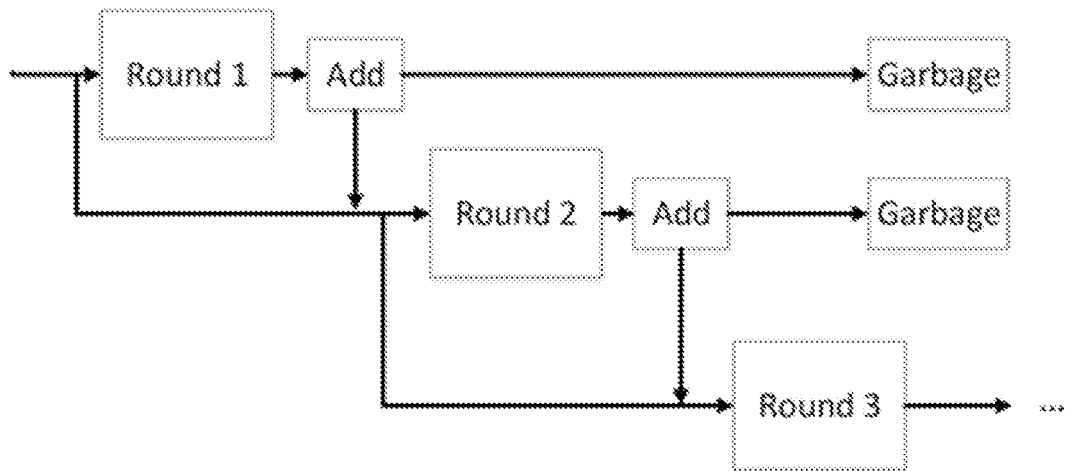
FIG. 15 shows a portion of an example program that implements a SHA-2 cipher.
FIG. 16 shows a data flow diagram corresponding an example SHA-2 cipher for 3 rounds of the cipher.

An example hash function was also evaluated. In particular, a practical hash function (SHA-2) was evaluated using embodiments of the disclosed technology. FIG. 15 shows a snippet 1500 of code from the main loop in the SHA example evaluated.

FIG. 16 is a data flow diagram 1600 corresponding to the SHA-2 cipher. Note that the cipher has an internal state which gets passed from one round to the next round, leading to garbage qubits (ancillas) that when implemented with a lazy clean-up strategy will accumulate and will lead to a large space overhead.

Figure 17:
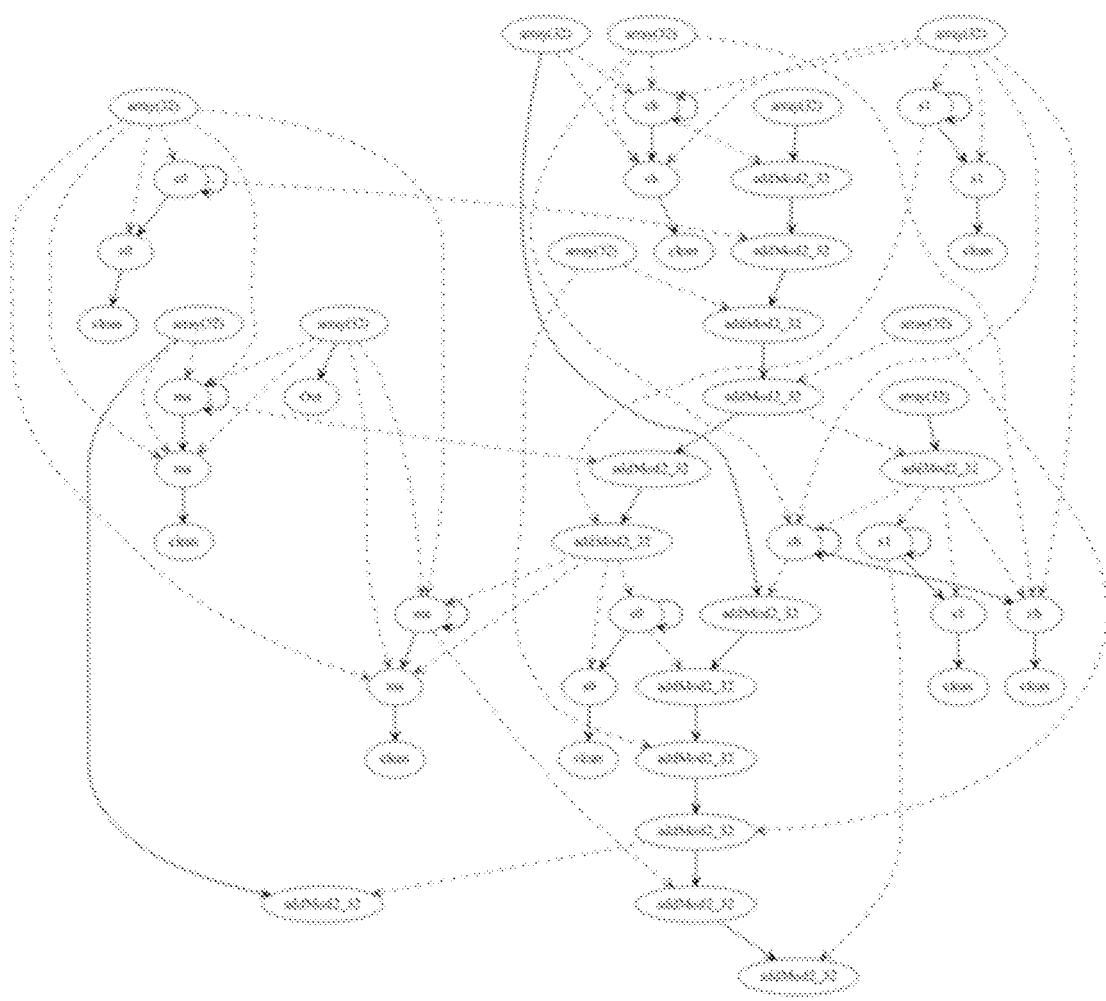
FIG. 17 shows an MDD graph for two rounds of the SHA-2 cipher.

For illustrative purposes, FIG. 17 is a diagram 1700 showing the MDD for two rounds of the SHA-2 cipher.

The example eager clean-up scheme introduced above was compared with the so-called Bennett method by compiling rounds of the SHA-2 hashing algorithm.

TABLE 5

| | Bennett cleanup | | | Eager cleanup | | |
|---|---|---|---|---|---|---|
| Rounds | #gates | #qubits | time | #gates | #qubits | time |
| 1 | 3680 | 486 | 4.2460 | 2496 | 353 | 4.4543 |
| 2 | 7328 | 621 | 4.2853 | 4800 | 360 | 4.5293 |
| 3 | 10976 | 756 | 4.3426 | 7104 | 367 | 4.5999 |
| 4 | 14624 | 891 | 4.3826 | 9408 | 374 | 5.0010 |
| 5 | 18272 | 1026 | 4.5430 | 11520 | 386 | 5.3094 |
| 6 | 21920 | 1161 | 4.5551 | 13824 | 393 | 5.3826 |
| 7 | 25568 | 1296 | 4.6329 | 16128 | 400 | 5.5036 |
| 8 | 29216 | 1431 | 4.6576 | 18432 | 407 | 5.5748 |
| 9 | 32864 | 1566 | 4.8301 | 20736 | 414 | 5.5861 |
| 10 | 36512 | 1701 | 4.9460 | 23040 | 421 | 6.0344 |

Table 5 shows a comparison of different compilation strategies for the hash function SHA-2. In particular, Table 5 shows the resulting circuit size, measured by the total number of Toffoli gates, the resulting total number of qubits, and the time it took to compile the circuit for various numbers of rounds. All timing data are measure in seconds and resulted from running the F# compiler in Visual Studio 2013 on an Intel i7-3667@ 2 GHz 8 GB RAM under Windows 8.1. The table shows significant savings of almost a factor of 4 in terms of the total numbers of qubits required to synthesize the cipher when comparing the simple Bennett cleanup strategy versus the example embodiment of the eager cleanup strategy. The reason for this is that the Bennett cleanup methods allocates new space essentially for each gates versus the eager cleanup strategy that tries to clean up and reallocate space as soon as possible which for the round-based nature of the function can be done as soon as the round is completed.

Figure 18:
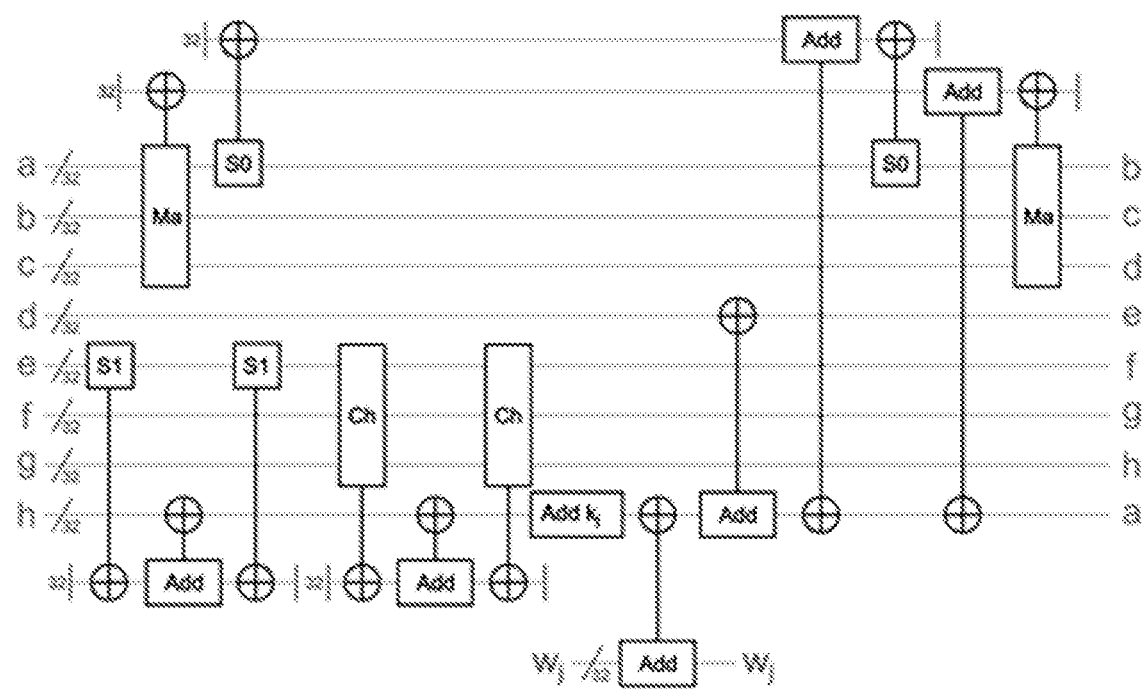
FIG. 18 is a circuit diagram illustrating a quantum circuit for SHA-2.

FIG. 18 is a circuit diagram 1800 illustrating a quantum circuit for SHA-2 that was obtained by inspection of the cipher and translation into a structured circuit.

An alternative cleanup method from those discussed above is to just perform the Bennett method at function boundaries. This method will perform reasonably well in cases where no in-place functions are used. However, in certain embodiment, the primitive operation (the boolean expression) allows for in-place operation. The Bennett method assumes all operations are out of place and thus misses out on many opportunities to save on both space and time.

Consider though the case with in-place functions. Consider, for example, an input (a, b) where a calculation is performed to arrive at $f(b)$. Now consider that an in-place function which maps $(f(b), a) \mapsto (f(b), g(f(b), a))$. $g(f(b), a)$ is then set as the output of the function. Using embodiments of the eager clean-up method discussed above, only $f(b)$ is needed to be cleaned up and a new in-place function $(a,b) \mapsto (g(f(b)), a), b)$ is created. Even if a new in-place function is not desired to be created, this cleanup strategy can be useful. Consider the case where the function input is (a,b) and the output is (a,b,c) (with $C$ being allocated inside the function). Further, consider that some function is applied out-of-place to $G$, $(a,0) \mapsto (a, f(a))$, and some other calculation arriving at $f(b)$ is performed. Then consider that an in-place operation is desirably used to map $(g(b), f(a)) \mapsto (g(b), h(g(b), f(a)))$. Using an embodiment of the disclosed eager clean-up scheme, only $f(b)$ is needed to be cleaned to produce the function $(a,b) \mapsto (a,b,c)$ where $c=h(g(b), f(a))$.

An example of this situation is the SHA-2 function. In the implementation of the SHA-2 function given in the appendix, functions are calculated at each iteration only to be added in-place to the result. Using an embodiment of the eager clean-up scheme as introduced above, those functions can be immediately cleaned up since they are not needed after the addition is performed. This prevents additional ancilla from being used at each iteration. Even if each iteration were wrapped in a function, the total number of bits used would be higher. Looking at FIG. 18, for example, it can be seen that in the illustrated implementation each adder can be cleaned up before bits are allocated for the next. Using the Bennett method with the function boundary at each iteration, however, all of the adders would be cleaned up at the end so the total number of ancilla bits needed would be greater.

The example MDD graph structure introduced herein also provides information which could be used in other possible improvements to the disclosed methods. For example, if one wanted to trade off some time for space, some ancilla bits could be temporally cleaned up and recreated later. When taking this approach, for example, bits that are both easy to compute and have a large gap until the next time they are used in the computation can be selected. The example MDD graph structure introduced herein allows for quantification of both of these metrics. It also allows for the cleanup and re-computation strategies to be more easily generated.

II.F. General Embodiments

Figure 19:
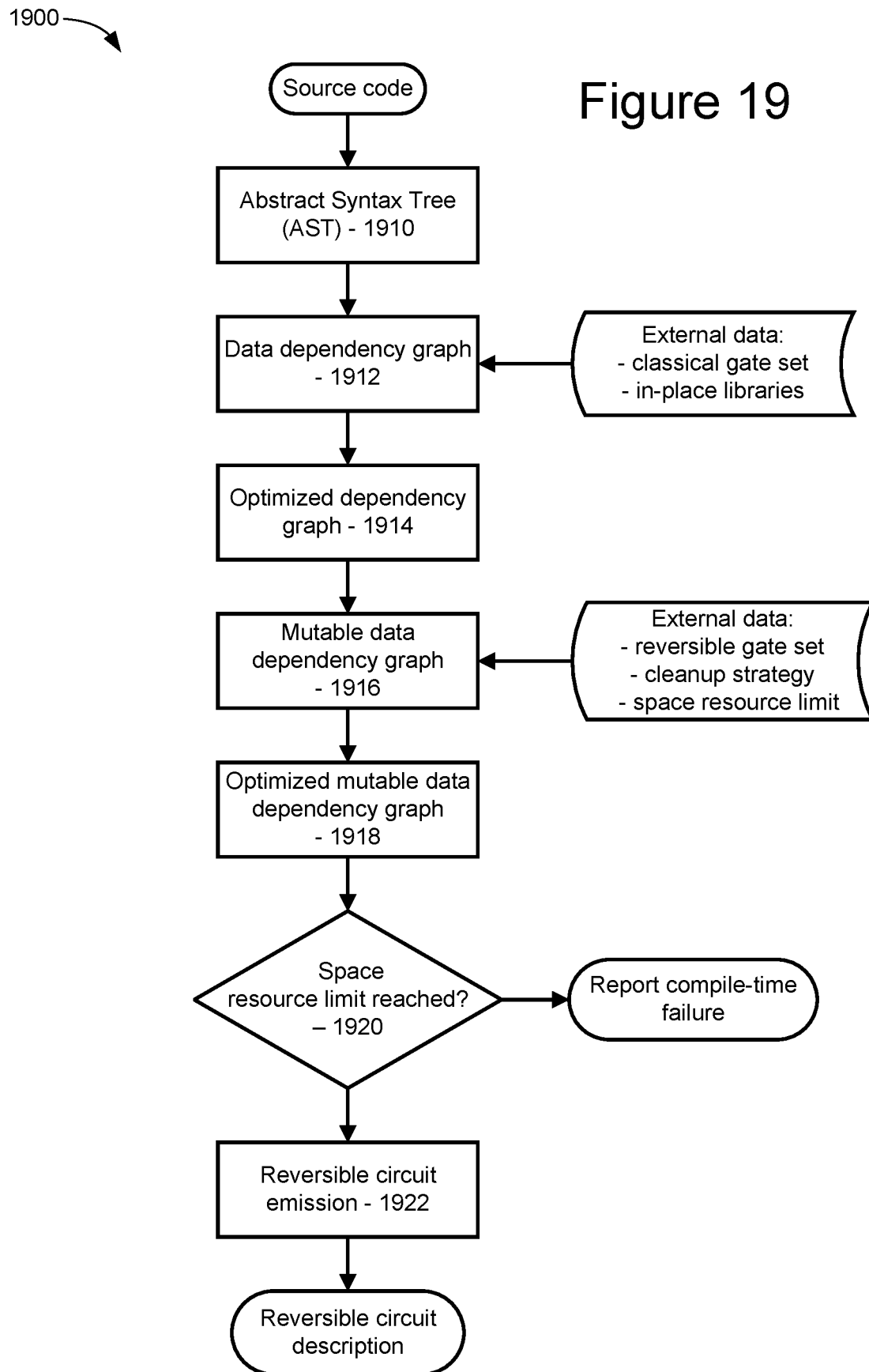
FIG. 19 is a flow chart showing an overall process for an example quantum-computer compilation (synthesis) process in accordance with embodiments of the disclosed technology.

FIG. 19 is a flow chart 1900 showing an overall process for an example reversible circuit compilation (synthesis) process in accordance with embodiments of the disclosed technology. In particular, the flow chart 1900 shows a series of intermediate representations through which an input source code file (e.g., a high-level description, such as an algorithmic description of desired reversible circuit behavior (according to a F# or other suitable high-level description)) is transformed into a lower-level (e.g., gate-level) description adapted for use with a reversible circuit, such as a quantum computer (e.g., a description of reversible gate networks (a description in the LIQUi|>, .qc, or other such suitable format). The size and complexity of the high-level description and the resulting lower-level description can vary. In certain example embodiments, for instance, the process of FIG. 19 (or any of the processes shown in FIGS. 19-24) generates a lower-level description specifying 500 or more, 1000 or more, or 2500 or more reversible gates.

The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 1910, an abstract syntax tree is generated from an input source code file. As noted, the source code file can be a high-level description, such as an algorithmic description of desired reversible circuit (e.g., quantum computer) behavior (according to a F# or other suitable high-level description). The abstract syntax tree can be generated by applying a suitable parser to the input source code file.

At 1912, a data dependency graph is generated from the abstract syntax tree. Generation of the data dependency graph can be guided by one or more of a set of classical gates (gate sets for classical non-reversible circuits) and/or in-place libraries.

At 1914, an optimized data dependency graph is generated from the data dependency graph. For example, optimizations can be performed to remove unused code portions (or branches) of the data dependency graph, to apply known optimized graph representations in place of recognized unoptimized portions, and/or other such optimizations.

At 1916, a mutable data dependency graph is generated from the optimized data dependency graph of 1941. In the example embodiment, reversible-computing considerations are introduced into the compilation/synthesis process. For example, at 1916, the generation of the mutable data dependency graph can be guided by replacement of classical gate sets with reversible gate sets (e.g., reversible gate sets suited for quantum computers). Additionally, the generation of the mutable data dependency graph can be guided by (or otherwise influenced by) a space constraint of the target reversible circuit (e.g., a total (maximum) number of bits available in the architecture of a target reversible circuit, such as a quantum computer)). Still further, the generation of the mutable data dependency graph can include application of any of the clean-up schemes discussed in detail above, which can reduce the total number of bits used to perform the computation described by the input source code. As also described above, generation of the mutable data dependency graph can include identifying mutable variables that may be re-used during the computation and/or use of in-place operations. Example procedures that can be performed at 1916 are discussed below with respect to FIG. 20.

At 1918, an optimized mutable data dependency graph is generated from the mutable data dependency graph. For example, optimizations can be performed to remove unused code portions (or branches) of the mutable data dependency graph, to apply known optimized graph representations in place of recognized unoptimized portions (e.g., using functionally equivalent but computationally improved operations in place of unoptimized portions according to one or more optimized templates in an optimized library), and/or other such optimizations. For instance, "peephole optimization" can be performed at 1918. Any of the clean-up schemes and/or in-place-operation techniques discussed in detail above can also be applied at this stage (e.g., instead of or in addition to the initial mutable data dependency graph generation at 1916).

At 1920, an evaluation (comparison) is made as to whether the number of bits used in the optimized mutable data dependency graph exceeds the total available bits in the target reversible circuit (e.g., the total available bits in the target quantum computer). The result of this evaluation is output to the user. For example, in certain implementations, an indication of the success or failure of the compilation/synthesis process is displayed to the user via a display device (e.g., as part of a user interface (such as a run-time interface for the compiler/synthesis tool). The evaluation and output at 1920 can also be performed with respect to an unoptimized mutable data dependency graph.

At 1922, a reversible circuit (e.g., a quantum computer circuit description) is emitted from the optimized mutable data dependency graph. This process can involve an initial or further: mapping of the optimized mutable data dependency graph to reversible gate sets, allocation of bits from the available bits of the target reversible circuit (e.g., the available bits of the target quantum computer), and/or optimization. Example procedures that can be performed at 1922 are discussed below with respect to FIG. 21. The reversible circuit can be a reversible circuit description stored in a variety of suitable gate-level formats specially adapted for reversible circuit architectures (e.g., LIQUi|>, .qc, or other such format). For example, the reversible circuit description can specify the one or more reversible gates as one or more of a sequence of Toffoli gates, Fredkin gates, Kerntopf gates, multiply controlled gates, CNOT gates, NOT gates, and/or other such reversible-circuit-specific gate networks.

Figure 28:
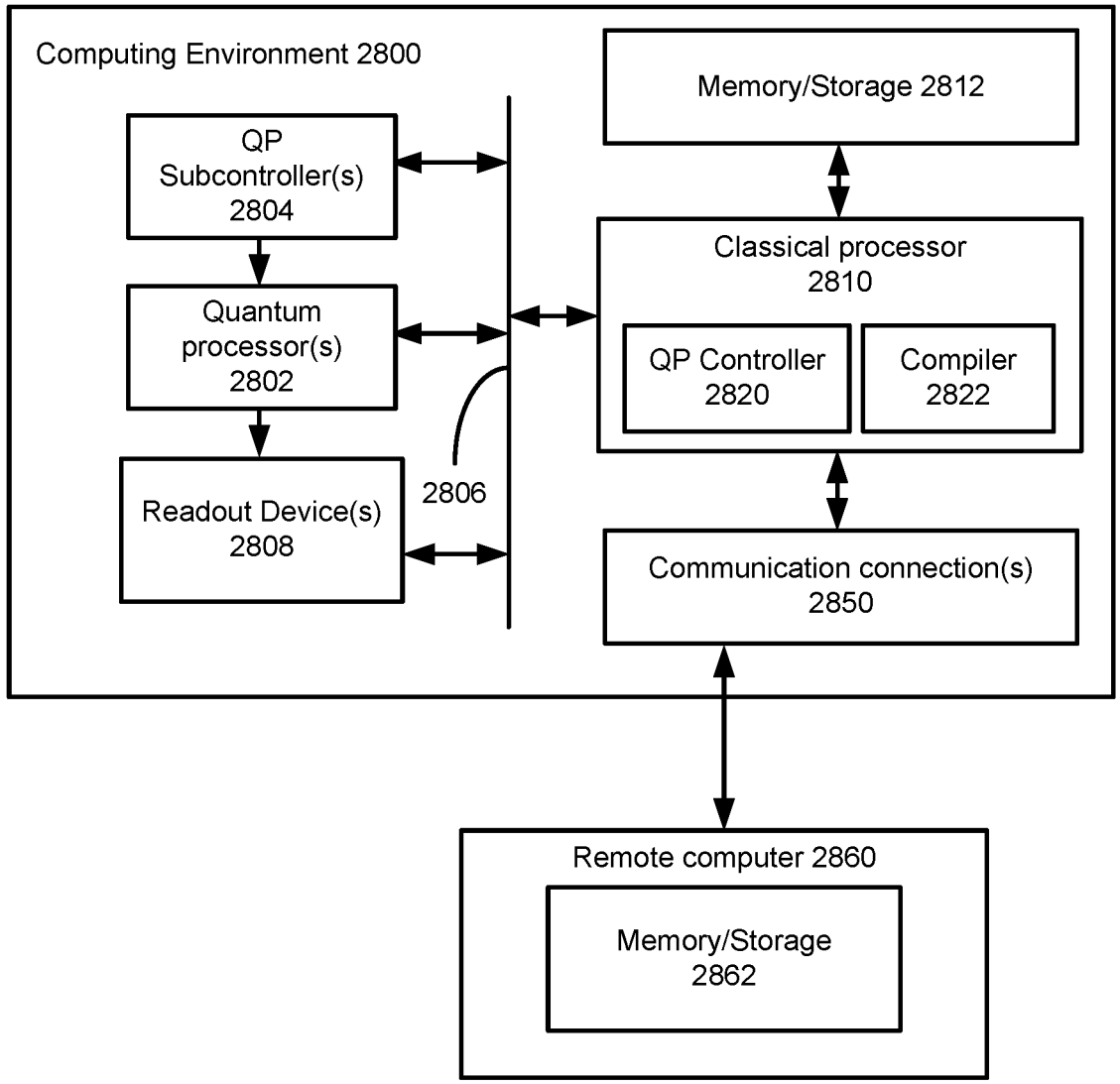
FIG. 28 shows an example quantum computing system in which aspects of the disclosed technology can be implemented.

The reversible circuit description output at 1922 can then be used to implement the one or more reversible gates specified by the reversible circuit description in a physical embodiment of a reversible circuit architecture (e.g., a quantum computer). The reversible circuit architecture can be any of a variety of reversible circuit architectures, including quantum computers. Such a quantum computing device can be configured to operate according to one of a variety of quantum computing principles. For instance, the quantum computer can be one or more of: (a) a superconducting quantum computer in which the qubits are stored in the energy levels of a superconductor and in which qubits are manipulated by applying external electromagnetic fields, thereby allowing implementation of the quantum computer circuit description by a universal gate set implemented by the superconducting quantum computer system; (b) an ion trap quantum computer in which the qubits are stored in the internal energy levels of trapped ions and in which qubits are manipulated by applying laser pulses, thereby allowing implementation of the quantum computer circuit description by a universal gate set implemented by the ion trap quantum computer system; or (c) a fault-tolerant architecture for quantum computing in which qubits are encoded using quantum error-correcting codes, or using a hierarchy of quantum error-correcting codes, and in which qubits are manipulated by means of encoded operations, thereby allowing implementation of the quantum computer circuit description as encoded operations over a universal fault-tolerant gate set. An example arrangement for controlling a quantum computer using the compiled/synthesized quantum circuit description is shown in FIG. 28. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

Figure 20:
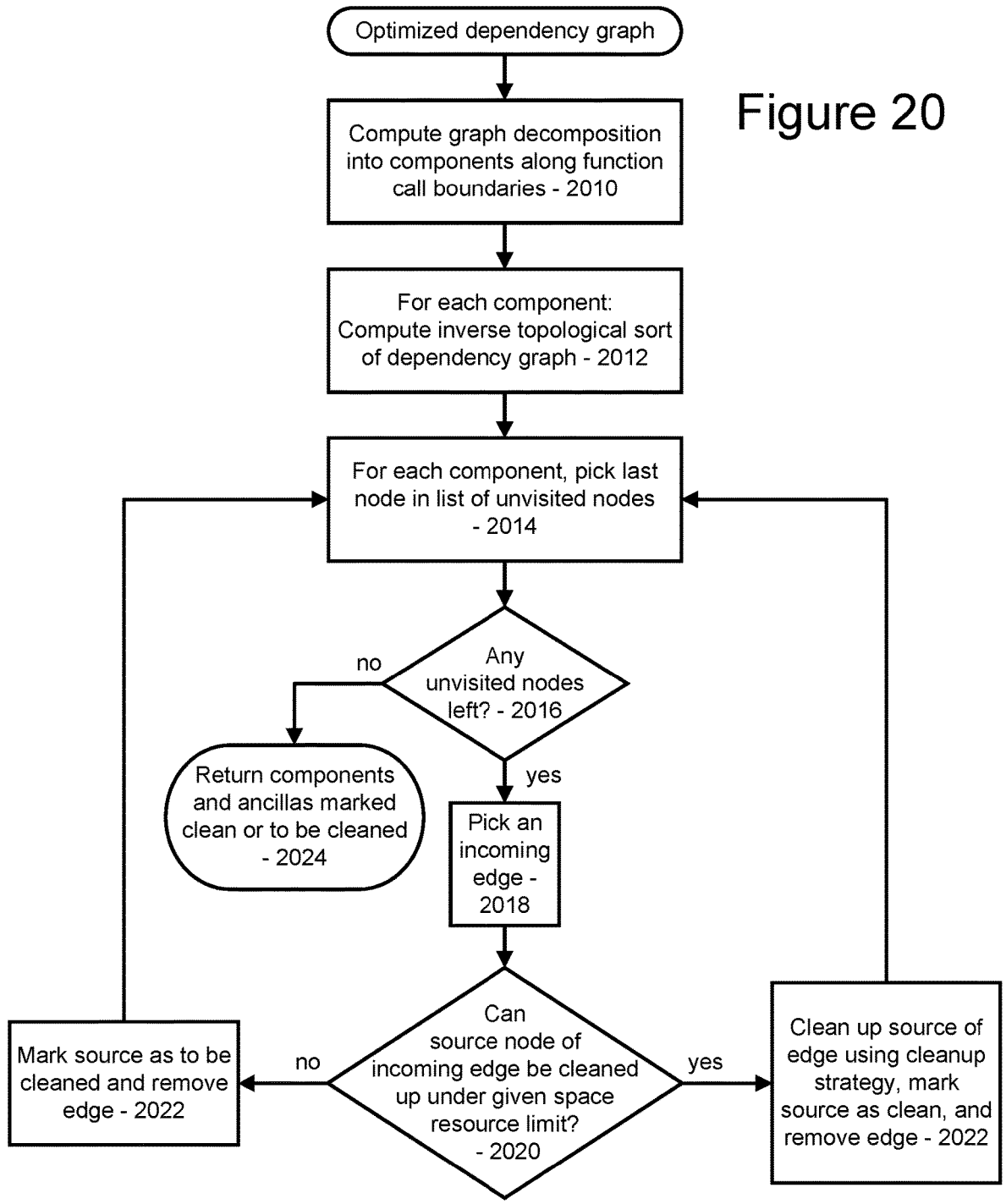
FIG. 20 is a flow chart showing an example embodiment for generating a mutable data dependency graph as can be performed during the overall process of FIG. 19.

FIG. 20 is a flow chart 2000 showing an example embodiment for generating a mutable data dependency graph as can be performed at process block 1916 of FIG. 19. The example embodiment can be performed by a reversible compilation/synthesis system. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 2010, the optimized dependency graph is input and a decomposition of the graph into components along function call boundaries is computed. At 2012, for each component, the inverse topological sort of the dependency graph is computed. At 2014, for each component, a determination is made as to whether there are any unvisited nodes, and, if so, the last node in the list of unvisited nodes is selected. If there are unvisited nodes (represented further as decision block 2016), then, at 2018, an incoming edge is selected. For a selected incoming edge, a determination is made at 2020 as to whether the source node of the incoming edge can be cleaned up under a given space resource limit. If so, then at 2022, the source of the edge is cleaned up (e.g., using one of the disclosed clean up strategies), the source is marked as "clean", and the edge is removed. If the source node cannot be cleaned up, then the source is marked "to be cleaned" (as part of a post-computation clean-up process, such as by applying the Bennett method). At the conclusion of the illustrated process, when there are no unvisited nodes as determined at decision block 2016, then components and ancillas marked as "clean" or "to be cleaned" are output at 2024.

Figure 21:
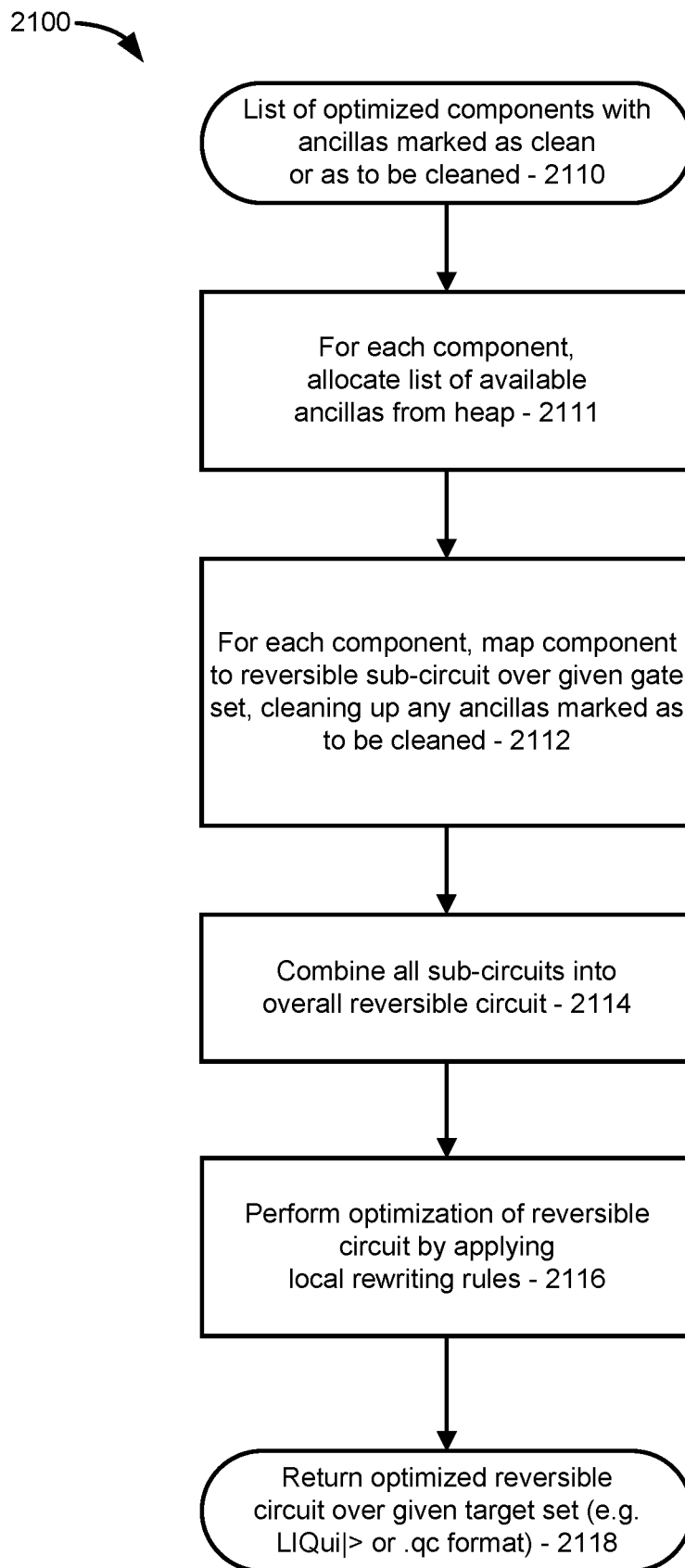
FIG. 21 is a flow chart showing an example embodiment for emitting (generating) a reversible circuit as can be performed during the overall process of FIG. 19.

FIG. 21 is a flow chart 2100 showing an example embodiment for emitting (generating) a reversible circuit as can be performed at 1922 of FIG. 19. The example embodiment can be performed by a reversible circuit compilation/synthesis system (e.g., a quantum-computer compilation/synthesis system). The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 2110, the list of optimized components with ancillas marked as "clean" or as "to be cleaned" is input. At 2111, for each component and for any unallocated ancillas, available ancillas from the heap data structure are allocated. At 2112, for each component, the component is mapped to a reversible sub-circuit over a given gate set, and any ancillas marked as "to be cleaned" are cleaned up by inserting appropriate reversing circuitry for the ancillas. At 2114, the sub-circuits are combined into an overall reversible circuit. At 2116, a further optimization of the resulting overall reversible circuit is performed (e.g., by applying local rewriting rules). At 2118, an optimized reversible circuit over a given target gate set is output in a suitable lower-level format (e.g., LIQUi|>, .qc, or other such format).

Figure 22:
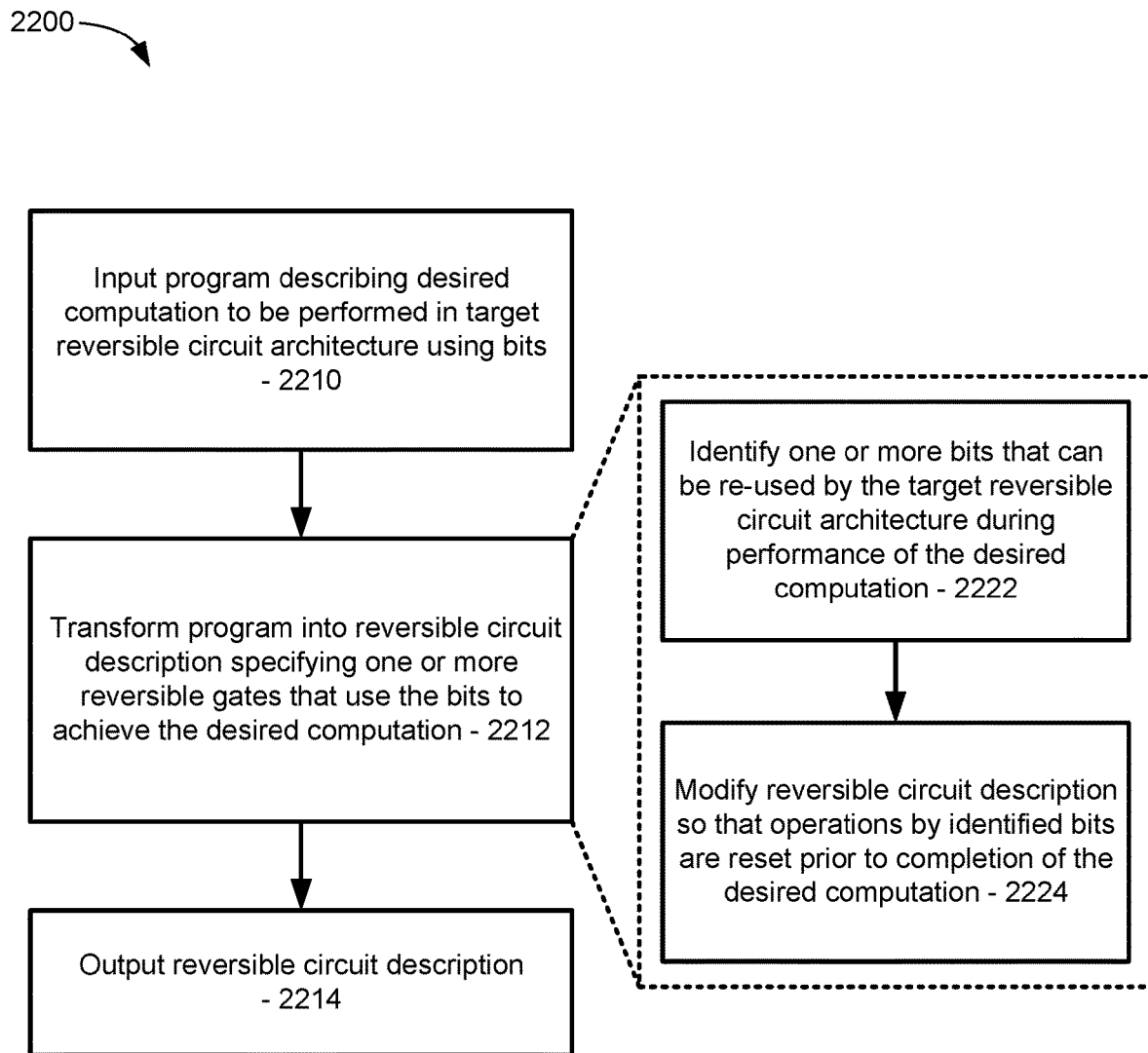
FIG. 22 is a flow chart showing another example embodiment for performing compilation (synthesis) for reversible circuits.

FIG. 22 is a flow chart 2200 showing an example embodiment for performing reversible circuit compilation (or synthesis). The example embodiment can be performed by a reversible circuit compilation/synthesis system. In certain example implementations, the method is performed for a quantum computer and the process is a quantum computer compilation/synthesis method. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 2210, a program describing a desired computation to be performed in a target reversible circuit architecture (e.g., a quantum computer) using bits (e.g., qubits) is input (e.g., loaded into memory or otherwise prepared for further processing). The program can be, for example, a high-level algorithmic description, such as a F# description, having suitable programming language characteristics for describing desired behavior of a reversible circuit architecture, such as a quantum computer.

At 2212, the program is transformed into a reversible circuit description specifying one or more reversible gates that use the bits to achieve the desired computation. In the illustrated embodiment, and as shown at 2220 as part of the transformation, one or more bits of the target reversible circuit architecture are identified that can be re-used by the target reversible circuit architecture during performance of the desired computation, and, as shown at 2222 as part of the transformation, the reversible circuit description is modified such that the reversible gates associated with the identified bits are reset prior to completion of the desired computation, thereby cleaning up the identified bits for re-use for other operations within the desired computation described by the program. For example, the reversible circuit description can be modified to include a sequence of gates that reverse the operations performed with the identified bits (e.g., with qubits of a quantum computer) prior to completion of the desired computation. The reversible circuit description can have a variety of suitable gate-level formats specially adapted for reversible circuit architectures (e.g., LIQUi|>, .qc, or other such format). For example, the reversible circuit description can specify the one or more reversible gates as one or more of a sequence of Toffoli gates, Fredkin gates, Kerntopf gates, multiply controlled gates, CNOT gates, NOT gates, and/or other such reversible-circuit-specific gate networks.

At 2214, the reversible circuit description is output (e.g., stored in memory or other volatile or nonvolatile storage device).

In certain example embodiments, and as part of the transformation of the program into the reversible circuit description, a mutable data dependency graph is generated having nodes and edges that describe control flow and data dependencies of the variables and expressions in the program. In particular implementations, the mutable data dependency graph further includes indicators that identify one or more mutable data paths. The mutable data dependency graph being can be stored as a data structure (e.g., in memory or other volatile or nonvolatile storage device). In some embodiments, the one or more bits (e.g., qubits) that can be re-used are identified from the mutable data dependency graph and from the indicators that identify the one or more of the mutable data paths. In particular implementations, the identified bits are ancilla bits (e.g., ancilla qubits). In some example embodiments, all possible bits of the target reversible circuit architecture (e.g., all possible qubits of the target quantum computer) that can be re-used by the target reversible circuit architecture (e.g., the target quantum computer) during performance of the desired computation are identified and cleaned up by the compiler. In other example embodiments, a subset of all possible bits of the target reversible circuit architecture (e.g., a subset of all possible qubits of the target quantum computer) that can be re-used by the target reversible circuit architecture (e.g., the target quantum computer) during performance of the desired computation are identified and cleaned up by the compiler. In certain embodiments, the compilation/synthesis process can include identifying one or more of the bits of the target reversible circuit architecture that can be re-used only when one or more criteria are satisfied. For example, the criteria can include evaluating when the number bits available in the target reversible circuit architecture falls below some threshold, evaluating whether the previously allocated bits satisfy some threshold (e.g., a total number allocated, a degree of fragmentation, or other threshold), and/or other criteria. In some embodiments, the compilation/synthesis process includes accounting for a number of bits (e.g., qubits) available in the target reversible circuit architecture (e.g., the target quantum computer) as compilation proceeds. For instance, in particular implementations, such accounting can be performed by monitoring a number of bits available in the target reversible circuit architecture as part of the transformation of the program into the reversible circuit description; and identifying one or more of the bits of the target reversible circuit architecture that can be re-used by monitoring when the number of bits available in the target reversible circuit architecture satisfies a threshold number. When used for quantum computers, this corresponds to monitoring a number of qubits available in the target quantum computer as part of the transformation of the program into the quantum computer circuit description; and identifying one or more of the qubits of the target quantum computer that can be re-used by monitoring when the number of qubits available in the target quantum computer satisfies a threshold number. Further, in some implementations, a heap data structure (e.g., stored in memory or other volatile or nonvolatile storage device) is used to assist with the accounting for the available number of bits (e.g., qubits). For example, the heap data structure can identify bits of the target reversible circuit architecture (e.g., qubits of the target quantum computer) currently available to the compiler/synthesis tool. Further, the compiler/synthesis tool can be configured to return one or more bits (e.g., qubits) for re-use to the heap data structure as the transformation of the program into the reversible circuit description performed by the reversible circuit compiler proceeds.

The reversible circuit description output at 2214 can then be used to implement the one or more reversible gates specified by the reversible circuit description in a physical embodiment of a reversible circuit architecture (e.g., a quantum computer). The reversible circuit architecture can be any of a variety of reversible circuit architectures, including quantum computers. Such a quantum computing device can be configured to operate according to one of a variety of quantum computing principles. For instance, the quantum computer can be one or more of: (a) a superconducting quantum computer in which the qubits are stored in the energy levels of a superconductor and in which qubits are manipulated by applying external electromagnetic fields, thereby allowing implementation of the quantum computer circuit description by a universal gate set implemented by the superconducting quantum computer system; (b) an ion trap quantum computer in which the qubits are stored in the internal energy levels of trapped ions and in which qubits are manipulated by applying laser pulses, thereby allowing implementation of the quantum computer circuit description by a universal gate set implemented by the ion trap quantum computer system; or (c) a fault-tolerant architecture for quantum computing in which qubits are encoded using quantum error-correcting codes, or using a hierarchy of quantum error-correcting codes, and in which qubits are manipulated by means of encoded operations, thereby allowing implementation of the quantum computer circuit description as encoded operations over a universal fault-tolerant gate set. An example arrangement for controlling a quantum computer using the compiled/synthesized quantum circuit description is shown in FIG. 28. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

Figure 23:
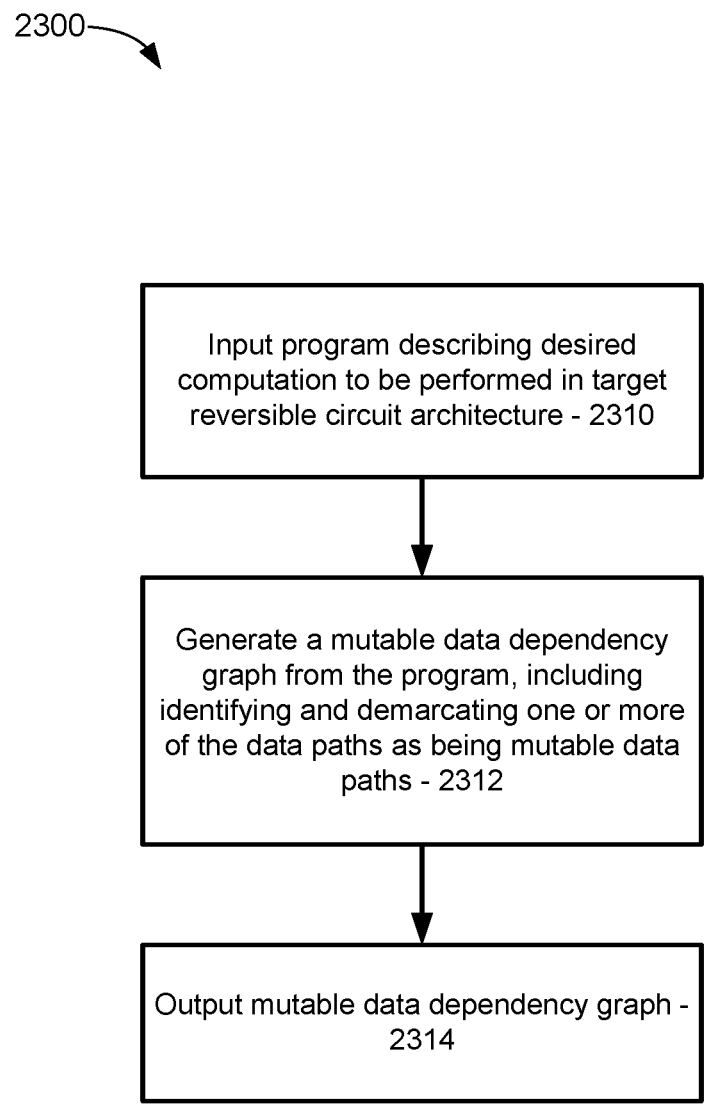
FIG. 23 is a flow chart showing a further example embodiment for performing compilation (synthesis) for reversible circuits.

FIG. 23 is a flow chart 2300 showing another example embodiment for performing reversible circuit compilation (or synthesis). The example embodiment can be performed by a reversible circuit compilation/synthesis system. In certain example implementations, the method is performed for a quantum computer and the process is a quantum computer compilation/synthesis method. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 2310, a program describing a desired computation to be performed in a target reversible circuit architecture (e.g., a target quantum computer) using bits (e.g., qubits) is input (e.g., loaded into memory or otherwise prepared for further processing). The program can be, for example, a high-level algorithmic description, such as a F# description, having suitable programming language characteristics for describing desired behavior of a reversible circuit.

At 2312, a mutable data dependency graph is generated from the program. In particular implementations, the mutable data dependency graph describes nodes interconnected by edges, the nodes and the edges representing a flow of data along data paths as described by the program. In certain embodiments, the mutable data dependency graph is generated by parsing the program and generating an abstract syntax tree from the parsed program. In the illustrated embodiment, the generating of the mutable data dependency graph further comprises identifying and demarcating one or more of the data paths as being mutable data paths. For instance, the identifying and demarcating the one or more of the data paths as being mutable data paths can be performed by (i) identifying a data path as being for a variable denoted in the program as being mutable, or (ii) recognizing a data path as being mutable based on a library of recognized operations.

At 2314, the mutable data dependency graph is output (e.g., stored in memory or other volatile or nonvolatile storage device).

In some embodiments, the compilation/synthesis process further comprises, based on the mutable data paths of the mutable data dependency graph, identifying one or more nodes that can be reset (e.g., reversed) and cleaned-up without creating an adverse data dependency in any other node. Further, a reversible circuit description (e.g., a quantum computer circuit description) can be generated from the mutable data dependency graph. The reversible circuit description can have a variety of suitable gate-level formats specially adapted for reversible circuit architectures, such as quantum computing architectures (e.g., LIQUi|>, .qc, or other such format). For example, the reversible circuit description can specify the one or more reversible gates as a sequence of Toffoli gates, Fredkin gates, Kerntopf gates, multiply controlled gates, CNOT gates, NOT gates, and/or other such reversible-circuit-specific gate networks. In certain implementations, the generating of the reversible circuit description can comprise adding circuit operations that reset or reverse, and thereby clean-up, one or more bits (e.g., qubits) corresponding respectively to the one or more nodes identified as being reversible. In particular implementations, these bits are ancilla bits (e.g., ancilla qubits). In some implementations, the generating of the reversible circuit description is performed such that, in the resulting reversible circuit description (e.g., the resulting quantum computer circuit description), at least some of the circuit operations that reset (e.g., by reversing operations) and clean-up the one or more bits (e.g., qubits) are performed prior to completion of all operations described by the program. In other implementations, the generating of the reversible circuit description is performed such that, in the resulting reversible circuit description (e.g., the resulting quantum computer circuit description), at least some of the circuit operations that reset (e.g., by reversing operations) and clean-up the one or more bits (e.g., qubits) are performed after results from the computation are read out and/or after completion of all operations described by the program. In further implementations, the generating of the reversible circuit description is performed such that, in the resulting reversible circuit description (e.g., the resulting quantum computer circuit description), at least some of the circuit operations that reset (e.g., by reversing operations) and clean-up the one or more bits (e.g., qubits) are performed as soon as the one or more bits are no longer needed for their original operation. In some implementations, the generating of the reversible circuit description is performed such that the adding of the circuit operations that reset (e.g., by reversal) and clean-up the one or more bits (e.g., qubits) is triggered by a determination that an available number of bits in a target reversible circuit architecture satisfies a threshold value (e.g., the available number of qubits in a target quantum computer architecture satisfies a threshold value). In further implementations, the generating of the reversible circuit description is performed such that at least some of the circuit operations that reset (e.g., by reversing operations) and clean-up the one or more bits (e.g., qubits) are performed at function boundaries of the high-level description. Still further, in some implementations, the generating of the reversible circuit description is performed such that at least some of the circuit operations that reverse (e.g., by reversing operations) and clean-up the one or more bits (e.g., qubits) are performed based on a space-time analysis (e.g., a pebble-game analysis) for the program as constrained by an available number of bits in a the target reversible circuit architecture (e.g., an available number of qubits in the target quantum computer).

The reversible circuit description generated from the mutable data dependency graph can be used to implement the one or more reversible gates specified by the reversible circuit description in a physical embodiment of a reversible circuit architecture, such as a quantum computer. Such a quantum computer can be a quantum computing device configured to operate according to one of a variety of quantum computing principles. For instance, and as more fully described above with respect to FIG. 23, the quantum computer can be one or more of: (a) a superconducting quantum computer; (b) an ion trap quantum computer; or (c) a fault-tolerant architecture for quantum computing. An example arrangement for controlling a quantum computer using the compiled/synthesized quantum circuit description is shown in FIG. 28. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

Figure 24:
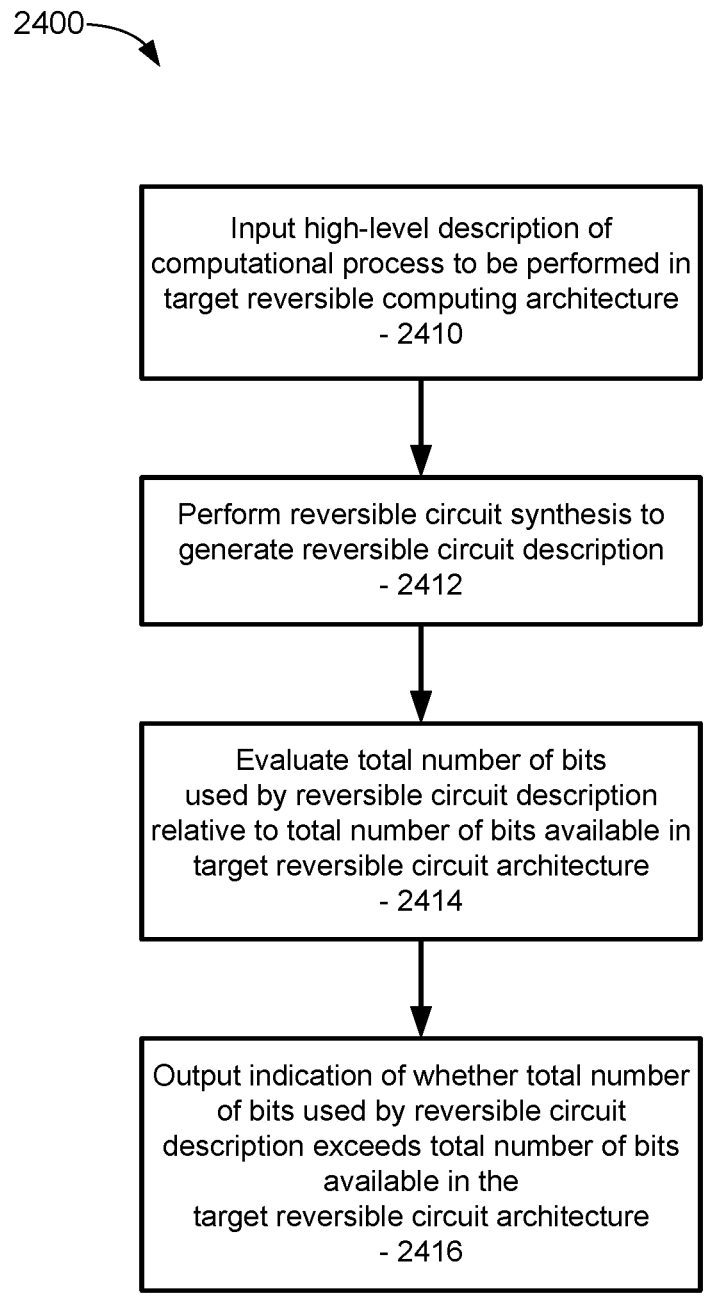
FIG. 24 is a flow chart showing another example embodiment for performing compilation (synthesis) for reversible circuits.

FIG. 24 is a flow chart 2400 showing another example embodiment for performing reversible circuit compilation (or synthesis). The example embodiment can be performed by a reversible compilation/synthesis system. In certain example implementations, the method is performed for a quantum computer and the process is a quantum computer compilation/synthesis method. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 2410, a high-level description of a computational process to be performed in a target reversible circuit architecture is input. The computational process described by the high-level description comprises a sequence of operations that together perform the computational process.

At 2412, a reversible circuit synthesis process is performed to generate a reversible circuit description (e.g., a quantum-computer circuit description) from the high-level description. The reversible circuit description specifies a sequence of reversible gates arranged to perform the sequence of operations using bits in the target reversible circuit architecture (e.g., qubits in the target quantum computer). The reversible circuit description can have a variety of suitable gate-level formats specially adapted for reversible circuit architectures, such as quantum computer architecture (e.g., LIQUi|>, .qc, or other such format). For example, the reversible circuit description can specify the one or more reversible gates as a sequence of Toffoli gates, Fredkin gates, Kerntopf gates, multiply controlled gates, CNOT gates, NOT gates, and/or other such reversible-circuit-specific gate networks.

At 2414, a total number of bits used by the reversible circuit architecture is evaluated (compared) relative to total a number of bits available in the target reversible circuit architecture. For example, for a quantum computer, a total number of qubits used by the quantum computer circuit description is evaluated (compared) relative to total a number of qubits available in the target quantum computer.

At 2416, an indication is output of whether the total number of bits used by the reversible circuit description exceeds the total number of bits available in the target reversible circuit architecture. In the context of this process being used for a quantum computer, an indication can be output of whether the total number of qubits used by the quantum computer circuit description exceeds the total number of qubits available in the target quantum computer. If the total number of bits used by the reversible circuit description exceeds the total number of bits available in the target reversible circuit architecture, an indication can be generated and displayed to a user that the synthesis process was not successful for the target reversible circuit architecture and its available bits.

In certain embodiments, the reversible circuit synthesis process can comprise applying one or more clean-up mechanisms that reduce the total number of bits (e.g., qubits) used by the reversible circuit description (e.g., by the quantum computer circuit description). This reduction of bits (or qubits) can be relative to a total number of bits used when all ancillary bits maintain their state throughout the computation, such as in the so-called Bennett method. The clean-up mechanisms can reduce the total number of bits used by the reversible circuit description by: recognizing mutable variables from the high-level description; and generating resetting operations (such as reversing operations) in the reversible circuit description that return the variables to their original state, thereby freeing corresponding bits in the corresponding target reversible circuit architecture for re-use. For example, in the context of this process being used for a quantum computer, the clean-up mechanisms can reduce the total number of qubits used by the quantum computer circuit description by: recognizing mutable variables from the high-level description; and generating reversing operations in the quantum-computer circuit description that return the variable to their original quantum state, thereby freeing corresponding qubits in the corresponding target quantum computer for re-use. In particular implementations, the resetting operations (such as reversing operations) are specified by the reversible circuit description as being implemented prior to completion of the sequence of operations that together perform the computational process. The reversible circuit synthesis process can also comprises using in-place operations rather than out-of-place operations for performing one or more of the operations in the sequence of operation of the high-level description.

The reversible circuit description generated at 2412 can be used to implement the one or more reversible gates specified by the reversible circuit description in a physical embodiment of the reversible circuit architecture, such as a quantum computer. Such a quantum computing device configured to operate according to one of a variety of quantum computing principles. For instance, and as more fully described above with respect to FIG. 23, the quantum computer can be one or more of: (a) a superconducting quantum computer; (b) an ion trap quantum computer; or (c) a fault-tolerant architecture for quantum computing. An example arrangement for controlling a quantum computer using the compiled/synthesized quantum circuit description is shown in FIG. 28. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

III. Example Computing Systems

Any of the disclosed methods can be implemented as computer-executable instructions stored on one or more computer-readable media (e.g., tangible computer-readable memory or storage devices, such as one or more optical media discs, volatile memory components (such as DRAM or SRAM), or nonvolatile memory or storage components (such as hard drives or solid state drives (e.g., solid state drives based on flash memory)) and executed on a computer (e.g., any suitable computer, including desktop computers, laptop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., tangible computer-readable memory or storage devices). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), a distributed computing network, or other such network) using one or more network computers. Additionally, any intermediate or final result created or modified using any of the disclosed methods can be stored on a storage medium (e.g., one or more optical media discs, volatile memory or storage components (such as DRAM or SRAM), or nonvolatile memory or storage components (such as hard drives or solid state drives)) and are considered to be within the scope of this disclosure.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in Python, C++, Java, Perl, JavaScript, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is designed or configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")).

Figure 25:
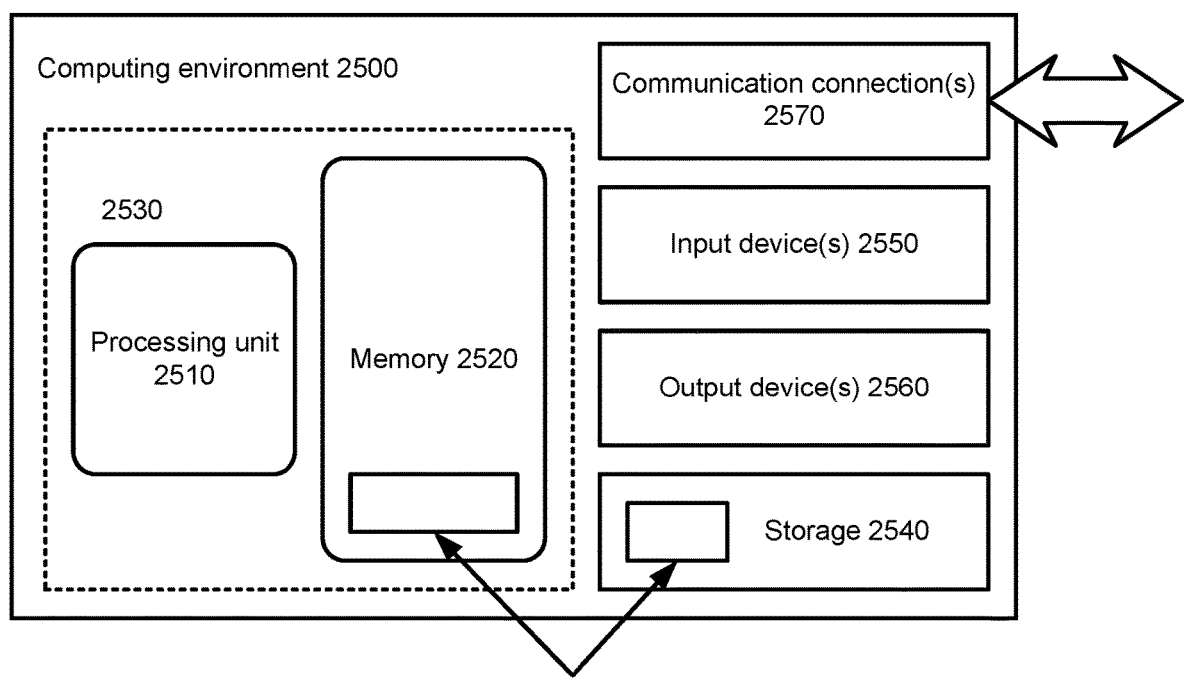
FIG. 25 shows an example computing environment in which aspects of the disclosed technology can be implemented.

FIG. 25 illustrates a generalized example of a suitable computing environment 2500 in which several of the described embodiments can be implemented. The computing environment 2500 is not intended to suggest any limitation as to the scope of use or functionality of the disclosed technology, as the techniques and tools described herein can be implemented in diverse general-purpose or special-purpose environments that have computing hardware.

With reference to FIG. 25, the computing environment 2500 includes at least one processing unit 2510 and memory 2520. In FIG. 25, this most basic configuration 2530 is included within a dashed line. The processing unit 2510 executes computer-executable instructions. In a multi-processing system, multiple processing units execute computer-executable instructions to increase processing power. The memory 2520 may be volatile memory (e.g., registers, cache, RAM, DRAM, SRAM), non-volatile memory (e.g., ROM, EEPROM, flash memory), or some combination of the two. The memory 2520 stores software 2580 implementing one or more of the described reversible circuit compilation/synthesis tools and/or techniques described herein.

For example, the memory 2520 can store software 2580 for implementing any of the disclosed techniques described herein and their accompanying user interfaces.

The computing environment can have additional features. For example, the computing environment 2500 includes storage 2540, one or more input devices 2550, one or more output devices 2560, and one or more communication connections 2570. An interconnection mechanism (not shown), such as a bus, controller, or network, interconnects the components of the computing environment 2500. Typically, operating system software (not shown) provides an operating environment for other software executing in the computing environment 2500, and coordinates activities of the components of the computing environment 2500.

The storage 2540 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 2500. The storage 2540 can also store instructions for the software 2580 implementing any of the described techniques, systems, or environments.

The input device(s) 2550 can be a touch input device such as a keyboard, touchscreen, mouse, pen, trackball, a voice input device, a scanning device, or another device that provides input to the computing environment 2500. The output device(s) 2560 can be a display device (e.g., a computer monitor, laptop display, smartphone display, tablet display, netbook display, or touchscreen), printer, speaker, or another device that provides output from the computing environment 2500.

The communication connection(s) 2570 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 2520 and/or storage 2540, and do not include propagating carrier waves or signals per se (tangible computer-readable memory or storage devices do not include propagating carrier waves or signals per se).

The various methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 26:
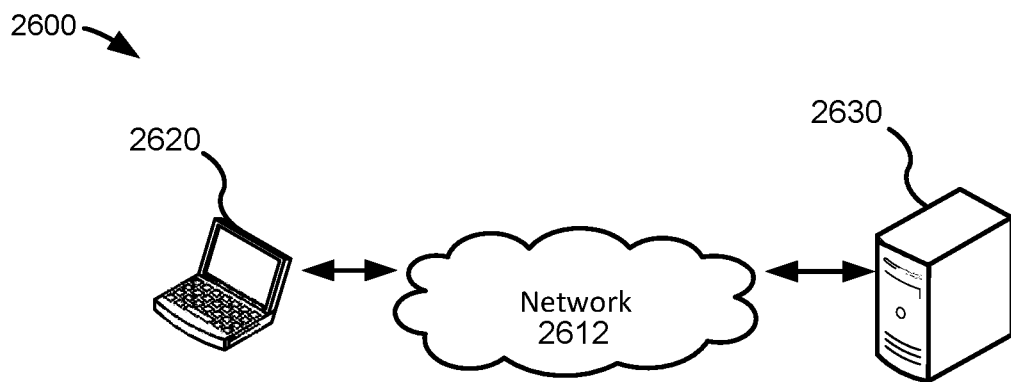
FIGS. 26 and 27 show two example network topologies with which aspects of the disclosed technology can be performed.

An example of a possible network topology 2600 (e.g., a client-server network) for implementing a system according to the disclosed technology is depicted in FIG. 26. Networked computing device 2620 can be, for example, a computer running a browser or other software connected to a network 2612. The computing device 2620 can have a computer architecture as shown in FIG. 25 and discussed above. The computing device 2620 is not limited to a traditional personal computer but can comprise other computing hardware configured to connect to and communicate with a network 2612 (e.g., smart phones, laptop computers, tablet computers, or other mobile computing devices, servers, network devices, dedicated devices, and the like). In the illustrated embodiment, the computing device 2620 is configured to communicate with a computing device 2630 (e.g., a remote server, such as a server in a cloud computing environment) via a network 2612. In the illustrated embodiment, the computing device 2620 is configured to transmit input data to the computing device 2630, and the computing device 2630 is configured to implement any of the disclosed methods and output results to the computing device 2620. Any of the data received from the computing device 2630 can be stored or displayed on the computing device 2620 (e.g., displayed as data on a graphical user interface or web page at the computing devices 2620). In the illustrated embodiment, the illustrated network 2612 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 2612 can be the Internet or a similar public network and operate using an appropriate protocol (e.g., the HTTP protocol).

Figure 27:
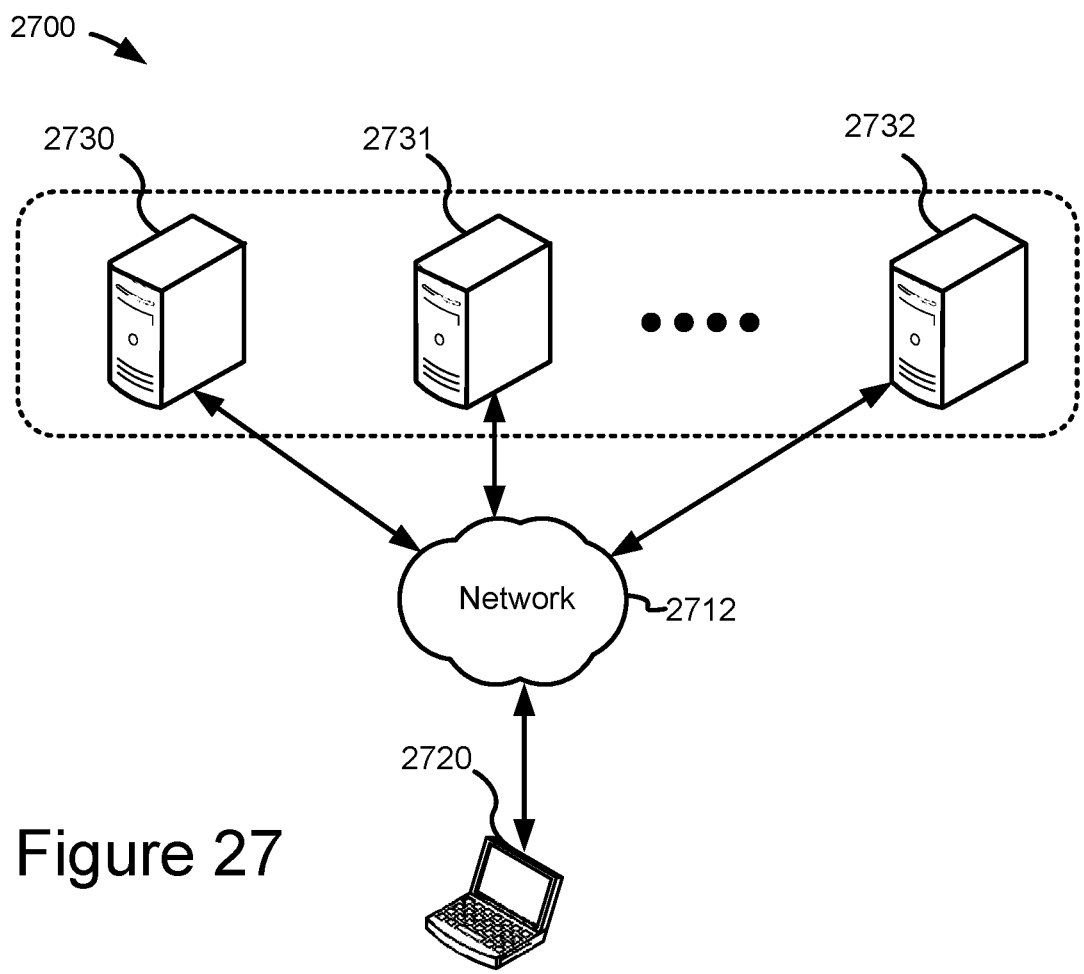

Another example of a possible network topology 2700 (e.g., a distributed computing environment) for implementing a system according to the disclosed technology is depicted in FIG. 27. Networked computing device 2720 can be, for example, a computer running a browser or other software connected to a network 2712. The computing device 2720 can have a computer architecture as shown in FIG. 25 and discussed above. In the illustrated embodiment, the computing device 2720 is configured to communicate with multiple computing devices 2730, 2731, 2732 (e.g., remote servers or other distributed computing devices, such as one or more servers in a cloud computing environment) via the network 2712. In the illustrated embodiment, each of the computing devices 2730, 2731, 2732 in the computing environment 2700 is used to perform at least a portion of the compilation/synthesis process. In other words, the computing devices 2730, 2731, 2732 form a distributed computing environment in which the compilation/synthesis process is shared across multiple computing devices. The computing device 2720 is configured to transmit input data to the computing devices 2730, 2731, 2732, which are configured to distributively implement a compilation/synthesis process, including performance of any of the disclosed methods, and to provide results to the computing device 2320. Any of the data received from the computing devices 2730, 2731, 2732 can be stored or displayed on the computing device 2720 (e.g., displayed as data on a graphical user interface or web page at the computing devices 2720). The illustrated network 2712 can be any of the networks discussed above with respect to FIG. 26.

With reference to FIG. 28, an exemplary system for implementing the disclosed technology includes computing environment 2800. In computing environment 2800, a compiled quantum computer circuit description can be used to program (or configure) one or more quantum processing units such that the quantum processing unit(s) implement the sequence of reversible gates described by the quantum computer circuit description. The quantum computer circuit description can be generated from any of the disclosed embodiments and can include the sequence of gates that reverse or reset ancilla qubit states, and thus enable the efficient re-use of qubits according to any of the space-spacing techniques disclosed herein. The environment 2800 includes one or more quantum processing units 2802 and one or more readout device(s) 2808. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; or (c) a fault-tolerant architecture for quantum computing. The precompiled quantum circuits, such as any of the disclosed networks of reversible gates or other procedures, can be sent into (or otherwise applied to) the quantum processing unit(s) via control lines 2806 at the control of quantum processor controller 2820. The quantum processor controller (QP controller) 2820 can operate in conjunction with a classical processor 2810 to implement the desired quantum computing process. In the illustrated example, the QP controller 2820 further implements the desired quantum computer in process via one or more QP subcontrollers 2804 that are specially adapted to control a corresponding one of the quantum processor(s) 2802. For instance, in one example, the quantum controller 2820 facilitates implementation of the compiled quantum circuit by sending instructions to one or more memories (e.g., lower-temperature memories), which then pass the instructions to low-temperature control unit(s) (e.g., QP subcontroller(s) 2804) that transmit, for instance, pulse sequences representing the gates to the quantum processing unit(s) 2802 for implementation. In other examples, the QP controller(s) 2820 and QP subcontroller(s) 2804 operate to provide appropriate magnetic fields, encoded operations, or other such control signals to the quantum processor(s) to implement the operations of the compiled quantum computer circuit description. The quantum controller(s) can further interact with readout devices 2808 to help control and implement the desired quantum computing process (e.g., by reading or measuring out data results from the quantum processing units once available, etc.)

With reference to FIG. 28, and as discussed herein, compilation is the process of translating a high-level description of a quantum algorithm into a quantum circuit comprising a sequence of quantum operations or gates. The compilation can be performed by a compiler 2822 using a classical processor 2810 of the environment 2800 which loads the high-level description from memory or storage devices 2812 and stores the resulting quantum computer circuit description in the memory or storage devices 2812. In other embodiments, compilation can be performed remotely by a remote computer 2800 (e.g., a computer having a computing environment as described above with respect to FIG. 2500) which stores the resulting quantum computer circuit description in one or more memory or storage devices 2862 and transmits the quantum computer circuit description to the computing environment 2800 for implementation in the quantum processing unit(s) 2802. Still further, the remote computer 2800 can store the high-level description in the memory or storage devices 2862 and transmit the high-level description to the computing environment 2800 for compilation and use with the quantum processor(s). In any of these scenarios, results from the computation performed by the quantum processor(s) can be communicated to the remote computer after and/or during the computation process. Still further, the remote computer can communicate with the QP controller(s) 2820 such that the quantum computing process (including any compilation and QP processor control procedures) can be remotely controlled by the remote computer 2860. In general, the remote computer 2860 communicates with the QP controller(s) 2820 and/or compiler 2822 via communication connections 2850. In particular embodiments, the environment 2800 can be a cloud computing environment, which provides the quantum processing resources of the environment 2800 to one or more remote computers (such as remote computer 2860) over a suitable network (which can include the internet).

IV. Appendices

IV.A. Implementation of Depth Optimized Adders in Revs

FIG. 29 shows a program 2900 that provides details of a depth-optimized adder that is obtained from a standard classical construction which is then subsequently mapped to a reversible circuit using the compilation strategies available in Revs. A so-called carry-select adder implements the addition of two $r_t$-bit integers in depth $O(\sqrt{n})$. The basic idea is to decompose the $r_t$ bits into n/k blocks of size k each, then to perform an addition for each block separately with two adders, one for each possible value of the incoming carry. This leads to a doubling of the hardware cost plus the cost for multiplexers to select the correct sequence of adders for the given inputs, however, it also leads to a decrease in circuit depth as both branches can be synthesized for fixed value of the incoming carry and can be executed in parallel. By choosing the block size to be $k=O(\sqrt{n})$ it can be shown that $O(\sqrt{n})$ depth can be achieved using a circuit size that still scales linear with $r_t$. A basic F# implementation of a carry select adder is given on the next page.

IV.B. Depth Optimized Adders in Revs: Resource Estimates

Table 6 shows a comparison of different compilation strategies for $r_t$-bit adders that are optimized for overall circuit depth.

number of bits of size $O(\lceil\sqrt{n}\rceil)$. Also observe that unlike Table 2 here the number of gates differs between the three methods with the theoretically optimized version being lowest, then Bennett's cleanup method, followed by the eager cleanup which has the highest gate counts throughout. However, the space requirements for the eager cleanup are better throughout than Bennett's method, and for some values of $r_t$ even better than the theoretically optimized one (the eager cleanup strategy presents a possible space-time trade-off between circuit size and total number of qubits used). Like in case of the size optimized adders, the compilation times, measured in seconds, are comparable between the Bennett and eager cleanup strategies.

IV.C. Implementation of Hash Functions in Revs

The core part of the SHA-2 hash function family was already presented above. In this section, an implementation of an entire algorithm for computing the entire round functions of the SHA-256, which is a member of the SHA-2 family that hashes a bitstring of arbitrary length to a bitstring of length 256, is presented. The illustrated implementation actually only implements the round functions, which is the computationally most significant part of the cipher, and not the message expansion step. To describe the round functions, it is convenient to introduce 8 registers of 32 bits each and to denote them by A, B, . . . E. Further, the following Boolean functions are introduced to describe the round functions:

$$Ch(E,F,G):=(E \wedge F)\oplus(\neg E \wedge G)$$

$$Ma(A,B,C):=(A \wedge B)\oplus(A \wedge C)\oplus(B \wedge C)$$

$$\Sigma_0(A):=(A>>>2)\oplus(A>>>13)\oplus(A>>>22)$$

$$\Sigma_1(E):=(E>>>6)\oplus(E>>>11)\oplus(E>>>25)$$

For a given round, the values of all these functions is computed and considered to be 32 bit integers. Further, a constant 32 integer value $K_i$ is obtained from a lookup table which depends on the number i of the given round, where $i \in \{0, \ldots, 63\}$ and finally the next chunk of the message $W_i$ is obtained from the message after performing a suitable message expansion is performed as specified in the standard.

TABLE 6

|  | Optimized | | Bennett Cleanup | | | Eager Cleanup | | |
| --- | --- | --- | --- | --- | --- | --- | --- | --- |
| n | #gates | #qubits | #gates | #qubits | time | #gates | #qubits | time |
| 10 | 29 | 34 | 54 | 68 | 0.9185 | 76 | 46 | 1.0224 |
| 15 | 51 | 53 | 54 | 68 | 2.0576 | 76 | 46 | 2.2395 |
| 20 | 73 | 72 | 118 | 123 | 3.5797 | 194 | 78 | 4.0877 |
| 25 | 101 | 93 | 206 | 194 | 5.2340 | 344 | 118 | 6.0091 |
| 30 | 120 | 111 | 206 | 194 | 7.2253 | 344 | 118 | 8.2760 |
| 35 | 148 | 132 | 206 | 194 | 9.2332 | 344 | 118 | 10.5478 |
| 40 | 167 | 150 | 318 | 281 | 11.7660 | 566 | 166 | 13.6287 |

Figure 30B:
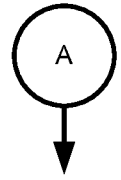

Shown are the results for a theoretically optimized quantum carry lookahead adder and two adders that results from applying the Revs compiler to a classical depth optimized carry select adder with respect to a cleanup strategy corresponding to Bennett's method and with respect to the eager cleanup strategy. Observe that the overall space requirement for the quantum circuits derived from the carry save arithmetic increases in a "plateau"-like fashion which is due to the usage of smaller size carry ripple adders that have a Finally, H is replaced according to $$H \leftarrow H+Ch(E,F,G)+Ma(A,B,C)+\Sigma_0(A)+\Sigma_1(E)+K_i+W_i,$$

and then the cyclic permutation $A \leftarrow H$, $B \leftarrow A$, . . . , $H \leftarrow G$ is performed. The example F# program 3000 illustrated in FIGS. 30A-B performs the computation of the entire round function for a given number of rounds n.

IV.D. Implementation of MD5 in Revs

Another hash function that was implemented in Revs is the so-called MD5 hash function. Although the MD5 has been disfavored by some, it is very useful as an example to exercise the compiler, as the building blocks used in the cipher are well-suited to demonstrate the ease with which a classical function can be turned into a reversible circuit using Revs. MD5 hashes a bitstring of arbitrary length to a bitstring of length 128 and, like SHA-256 in the previous section, the cipher consists of a simple round function that gets applied many times to the current internal state and the next bits from the input and a message expansion function that takes the incoming bitstream and partitions it into suitable chunks. As in case of SHA-256, focus is placed on the round function and how it can be implemented by means of a reversible circuit. The 128 bit state of MD5 can be conveniently expressed using 4 registers of 32 bits each, denoted by A, B, C, and D. Furthermore, the following Boolean functions are introduced:

$$F(B,C,D) := (B \wedge C) \vee (\neg B \wedge D)$$

$$G(B,C,D) := (B \wedge D) \vee *C \wedge \neg D)$$

$$H(B,C,D) := B \oplus C \oplus D$$

$$I(B,C,D) := C \oplus (B \vee \neg D).$$

Figure 31A:
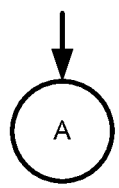

For a given round of index i precisely one of the functions $f\{F, \ldots, I\}$ is chosen according to a fixed schedule, then the value $f(B,C,D)$ is computed and then A is updated as $A \rightarrow A \oplus f(B,C,D) \oplus M_i \oplus K_i$s computed, where $K_i$ are pre-computed constants, and $M_i$ are the bits of the message after message expansion has been performed. Subsequently, a bit rotation to the left by $s_i$ positions, where $s_i$ again are precomputed constants, and a further xor sum with the B register is performed and the overall result is stored in the A register. Finally, a cyclic rotation $A \rightarrow D$, $B \rightarrow A$, $C \rightarrow B$, $D \rightarrow C$ is performed which is the result of the ith round. An example F# program 3100 is shown in FIGS. 31A-C that performs the computation of the entire round function for a given number of rounds $r_i$.

V. Features

Different embodiments may include one or more of the inventive features shown in the following table of features.

| # | Feature |
|---|---------|
| A1 | A reversible circuit compilation system, comprising: a memory; and a reversible circuit compiler, the reversible circuit compiler being configured to: input, into the memory, a program describing a desired computation to be performed in a target reversible circuit architecture using bits, transform the program into a reversible circuit description specifying one or more reversible gates that use the bits to achieve the desired computation, and store, in the memory, the reversible circuit description, the reversible circuit compiler being further configured to, as part of the transformation of the program into the reversible circuit description: identify one or more bits of the target reversible circuit architecture that can be re-used by the target reversible circuit architecture during performance of the desired computation, and modify the reversible circuit description such that the identified bits are reset to their original state prior to completion of the desired computation, thereby cleaning up the identified bits for re-use for other operations within the desired computation described by the program. |
| A2 | The reversible circuit compilation system of A1, wherein the reversible circuit compiler is further configured to, as part of the transformation of the program into the reversible circuit description, generate a mutable data dependency graph having nodes and edges that describe control flow and data dependencies of the variables and expressions in the program, the mutable data dependency graph further including indicators that identify one or more mutable data paths, the mutable data dependency graph being stored as a data structure in the memory. |
| A3 | The reversible circuit compilation system of A2, wherein the reversible circuit compiler is configured to identify the one or more bits that can be reset from the mutable data dependency graph and from the indicators that identify the one or more of the mutable data paths. |
| A4 | The reversible circuit compilation system of A1, wherein the reversible circuit compiler is further configured to identify one or more of the bits of the target reversible circuit architecture that can be reset to their original state prior to completion of the desired computation, the identifying being triggered by satisfaction of one or more criteria that are monitored during compilation. |
| A5 | The reversible circuit compilation system of A1, wherein the reversible circuit compiler is further configured to account for a number of bits available in the target reversible circuit architecture by: monitoring a number of bits available in the target reversible circuit architecture as part of the transformation of the program into the reversible circuit description; and when the number of bits available reaches a threshold value, identifying one or more of the bits of the target reversible circuit architecture that can be reset to their original state prior to completion of the desired computation. |

| # | Feature |
|---|---|
| A6 | The reversible circuit compilation system of A1, wherein all possible bits of the target reversible circuit architecture that can be reset to their original state during performance of the desired computation are identified and cleaned up by the reversible circuit compiler. |
| A7 | The reversible circuit compilation system of A1, wherein a subset of all possible bits of the target reversible circuit architecture that can be reset to their original state during performance of the desired computation are identified and cleaned up by the reversible circuit compiler. |
| A8 | The reversible circuit compilation system of A1, further comprising a heap data structure stored in the memory, the heap data structure storing data identifying bits of the target reversible circuit architecture currently available to the reversible circuit compiler. |
| A9 | The reversible circuit compilation system of A8, wherein the reversible circuit compiler is configured to return one or more bits for re-use to the heap data structure as the transformation of the program into the reversible circuit description performed by the reversible circuit compiler proceeds. |
| A10 | The reversible circuit compilation system of claim A1, wherein the reversible circuit description specifies the one or more reversible gates as a sequence of one or more NOT gates, CNOT gates, Toffoli gates, Fredkin gates, Kerntopf gates, or multiply controlled gates. |
| A11 | The reversible circuit compilation system of claim A1, further comprising a reversible circuit controller coupled to the target reversible circuit architecture and configured to implement the reversible circuit description in the target reversible circuit architecture. |
| A12 | The reversible circuit compilation system of claim A1, wherein the target reversible circuit architecture is a target quantum computer, wherein the reversible circuit description is a quantum computer circuit description, and wherein the bits are qubits. |
| A13 | The reversible circuit compilation system of claim A12, wherein the modification of the reversible circuit description comprises modifying the quantum computer circuit description such that operations performed with the identified qubits are reversed prior to completion of the desired computation, thereby cleaning up the identified qubits for re-use for the other operations within the desired computation described by the program |
| B1 | A method, comprising: by one or more specialized reversible circuit compilation tools adapted for use in a reversible circuit design and implementation process and implemented by one or more computing devices: inputting a program describing a desired computation to be performed in a target reversible circuit architecture using bits; generating a mutable data dependency graph from the program, the mutable data dependency graph describing nodes interconnected by edges, the nodes and the edges representing a flow of data along data paths as described by the program, the generating further comprising identifying and demarcating one or more of the data paths as being mutable data paths; and storing the mutable data dependency graph. |
| B2 | The method of claim B1, wherein the generating the mutable data dependency graph comprises parsing the program and generating an abstract syntax tree from the parsed program. |
| B3 | The method of claim B1, wherein the identifying and demarcating the one or more of the data paths as being mutable data paths is performed by (i) identifying a data path as being for a variable denoted in the program as being mutable, or (ii) recognizing a data path as being mutable based on a library of recognized operations. |
| B4 | The method of claim B1, further comprising, based on the mutable data paths of the mutable data dependency graph, identifying one or more nodes that can be reset during the desired computation and cleaned-up without creating an adverse data dependency in any other node. |
| B5 | The method of claim B1, further comprising generating a reversible circuit description from the mutable data dependency graph, the generating comprising adding circuit operations that reset and clean-up one or more bits corresponding respectively to the one or more nodes identified. |
| B6 | The method of claim B5, wherein the generating is performed such that at least some of the circuit operations that reset and clean-up the one or more bits are performed prior to completion of all operations described by the program. |
| B7 | The method of claim B5, wherein the generating is performed such that at least some of the circuit operations that reset and clean-up the one or more bits are performed after results from the computation are copied out and after completion of all operations described by the program. |
| B8 | The method of claim B5, wherein the generating is performed such that at least some of the circuit operations that reset and clean-up the one or more bits are performed as soon as the one or more bits are no longer needed for their original operation. |

| # | Feature |
|---|---|
| B9 | The method of claim B5, wherein the generating is performed such that the adding of the circuit operations that reset and clean-up the one or more bits is triggered by a determination that an available number of bits in a target reversible circuit architecture satisfies a threshold value. |
| B10 | The method of claim B5, wherein the generating is performed such that at least some of the circuit operations that reset and clean-up the one or more bits are performed at function boundaries of the high-level description. |
| B11 | The method of claim B5, wherein the generating is performed such that at least some of the circuit operations that reset and clean-up the one or more bits are performed based on a space-time tradeoff analysis for the program as constrained by an available number of bits in a target reversible circuit. |
| B12 | The method of claim B1, further comprising implementing the reversible circuit description in the target reversible circuit architecture. |
| B13 | The method of claim B1, wherein the target reversible circuit architecture using bits is a target quantum computer architecture using qubits, and wherein the method further comprises generating a quantum computer description from the mutable data dependency graph, the generating comprising adding circuit operations that reverse and clean-up one or more qubits corresponding respectively to the one or more nodes identified. |
| C1 | One or more tangible computer-readable memory or storage devices storing computer-executable instructions which when executed by a computer cause the computer to perform a space-aware reversible-circuit synthesis procedure comprising:<br>inputting a high-level description of a computational process to be performed in a target reversible circuit architecture, the computational process described by the high-level description comprising a sequence of operations that together perform the computational process;<br>performing a reversible circuit synthesis process to generate a reversible circuit description from the high-level description, the reversible circuit description specifying a sequence of reversible gates arranged to perform the sequence of operations using bits in the target reversible circuit architecture,<br>evaluating a total number of bits used by the reversible circuit description relative to total a number of bits available in the target reversible circuit architecture; and<br>outputting an indication of whether the total number of bits used by the reversible circuit description exceeds the total number of bits available in the target reversible circuit architecture. |
| C2 | The one or more tangible computer-readable memory or storage devices of claim C1, wherein the reversible circuit synthesis process comprises applying one or more clean-up mechanisms, the one or more clean-up mechanisms reducing the total number of bits used by the reversible circuit description. |
| C3 | The one or more tangible computer-readable memory or storage devices of claim C1, wherein the one or more clean-up mechanisms reduce the total number of bits used by the reversible circuit description by:<br>recognizing mutable variables from the high-level description; and<br>generating resetting or reversing operations in the reversible circuit description that return the mutable variables to their original state, thereby freeing corresponding bits in the corresponding target reversible circuit architecture for re-use, the resetting or reversing operations being implemented prior to completion of the sequence of operations that together perform the computational process. |
| C4 | The one or more tangible computer-readable memory or storage devices of claim C1, wherein the reversible circuit synthesis process comprises using in-place operations rather than out-of-place operations for performing one or more of the operations in the sequence of operation of the high-level description. |

VI. Concluding Remarks

Having illustrated and described the principles of the disclosed technology, it will be apparent to those skilled in the art that the disclosed embodiments can be modified in arrangement and detail without departing from such principles.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

The invention claimed is:

1. A reversible circuit compilation system, comprising:
a memory; and
a reversible circuit compiler, the reversible circuit compiler being configured to:
input, into the memory, a program describing a desired computation to be performed in a target reversible circuit architecture using bits, transform the program into a reversible circuit description specifying one or more reversible gates that use the bits to achieve the desired computation, and store, in the memory, the reversible circuit description, the reversible circuit compiler being further configured to, as part of the transformation of the program into the reversible circuit description:

identify one or more bits of the target reversible circuit architecture that can be re-used by the target reversible circuit architecture during performance of the desired computation, and modify the reversible circuit description such that the identified bits are reset to their original state prior to completion of the desired computation, thereby cleaning up the identified bits for re-use for other operations within the desired computation described by the program.

2. The reversible circuit compilation system of claim 1, wherein the reversible circuit compiler is further configured to, as part of the transformation of the program into the reversible circuit description, generate a mutable data dependency graph having nodes and edges that describe control flow and data dependencies of the variables and expressions in the program, the mutable data dependency graph further including indicators that identify one or more mutable data paths, the mutable data dependency graph being stored as a data structure in the memory, and wherein the reversible circuit compiler is configured to identify the one or more bits that can be reset from the mutable data dependency graph and from the indicators that identify the one or more of the mutable data paths.

3. The reversible circuit compilation system of claim 1, wherein the reversible circuit compiler is further configured to identify one or more of the bits of the target reversible circuit architecture that can be reset to their original state prior to completion of the desired computation, the identifying being triggered by satisfaction of one or more criteria that are monitored during compilation.

4. The reversible circuit compilation system of claim 1, wherein all possible bits of the target reversible circuit architecture that can be reset to their original state during performance of the desired computation are identified and cleaned up by the reversible circuit compiler.

5. The reversible circuit compilation system of claim 1, further comprising a heap data structure stored in the memory, the heap data structure storing data identifying bits of the target reversible circuit architecture currently available to the reversible circuit compiler, and wherein the reversible circuit compiler is configured to return one or more bits for re-use to the heap data structure as the transformation of the program into the reversible circuit description performed by the reversible circuit compiler proceeds.

6. The reversible circuit compilation system of claim 1, wherein the reversible circuit description specifies the one or more reversible gates as a sequence of one or more NOT gates, CNOT gates, Toffoli gates, Fredkin gates, Kerntopf gates, or multiply controlled gates.

7. The reversible circuit compilation system of claim 1, further comprising a reversible circuit controller coupled to the target reversible circuit architecture and configured to implement the reversible circuit description in the target reversible circuit architecture.

8. The reversible circuit compilation system of claim 1, wherein the target reversible circuit architecture is a target quantum computer, wherein the reversible circuit description is a quantum computer circuit description, wherein the bits are qubits, and wherein the modification of the reversible circuit description comprises modifying the quantum computer circuit description such that operations performed with the identified qubits are reversed prior to completion of the desired computation, thereby cleaning up the identified qubits for re-use for the other operations within the desired computation described by the program.

9. One or more tangible computer-readable memory or storage devices storing computer-executable instructions which when executed by a computer cause the computer to perform a space-aware reversible-circuit synthesis procedure comprising:

inputting a high-level description of a computational process to be performed in a target reversible circuit architecture, the computational process described by the high-level description comprising a sequence of operations that together perform the computational process;

performing a reversible circuit synthesis process to generate a reversible circuit description from the high-level description, the reversible circuit description specifying a sequence of reversible gates arranged to perform the sequence of operations using bits in the target reversible circuit architecture, evaluating a total number of bits used by the reversible circuit description relative to total a number of bits available in the target reversible circuit architecture; and outputting an indication of whether the total number of bits used by the reversible circuit description exceeds the total number of bits available in the target reversible circuit architecture.

10. One or more tangible computer-readable memory or storage devices storing computer-executable instructions which when executed by a computer cause the computer to perform a space-aware reversible-circuit synthesis procedure comprising:

inputting a program describing a desired computation to be performed in a target reversible circuit architecture using bits;

transforming the program into a reversible circuit description specifying one or more reversible gates that use the bits to achieve the desired computation; and storing the reversible circuit description, wherein the transforming further comprises:

identifying one or more bits of the target reversible circuit architecture that can be re-used by the target reversible circuit architecture during performance of the desired computation, and modifying the reversible circuit description such that the identified bits are reset to their original state prior to completion of the desired computation, thereby cleaning up the identified bits for re-use for other operations within the desired computation described by the program.

11. The one or more tangible computer-readable memory or storage devices of claim 10, wherein the space-aware reversible-circuit synthesis procedure further comprises:

generating a mutable data dependency graph having nodes and edges that describe control flow and data dependencies of the variables and expressions in the program, the mutable data dependency graph further including indicators that identify one or more mutable data paths, and identifying the one or more bits that can be reset from the mutable data dependency graph and from the indicators that identify the one or more of the mutable data paths.

12. The one or more tangible computer-readable memory or storage devices of claim 10, wherein the space-aware reversible-circuit synthesis procedure further comprises:

identifying one or more of the bits of the target reversible circuit architecture that can be reset to their original state prior to completion of the desired computation, the identifying being triggered by satisfaction of one or more criteria that are monitored during compilation.

13. The one or more tangible computer-readable memory or storage devices of claim 10, wherein all possible bits of the target reversible circuit architecture that can be reset to their original state during performance of the desired computation are identified and cleaned up by the reversible circuit compiler.

14. The one or more tangible computer-readable memory or storage devices of claim 10, further comprising:

generating a heap data structure, the heap data structure storing data identifying bits of the target reversible circuit architecture currently available to a reversible circuit compiler, and wherein the reversible circuit compiler is configured to return one or more bits for re-use to the heap data structure as the transformation of the program into the reversible circuit description performed by the reversible circuit compiler proceeds.

15. The one or more tangible computer-readable memory or storage devices of claim 10, wherein the reversible circuit description specifies the one or more reversible gates as a sequence of one or more NOT gates, CNOT gates, Toffoli gates, Fredkin gates, Kerntopf gates, or multiply controlled gates.

16. The one or more tangible computer-readable memory or storage devices of claim 10, wherein the target reversible circuit architecture is a target quantum computer, wherein the reversible circuit description is a quantum computer circuit description, wherein the bits are qubits, and wherein the modification of the reversible circuit description comprises modifying the quantum computer circuit description such that operations performed with the identified qubits are reversed prior to completion of the desired computation, thereby cleaning up the identified qubits for re-use for the other operations within the desired computation described by the program.

* * * * *